US010970967B2

(12) United States Patent
Tsutsui

(10) Patent No.: US 10,970,967 B2
(45) Date of Patent: Apr. 6, 2021

(54) ELECTRONIC VOUCHER TICKET SYSTEM

(71) Applicant: JCM American Corporation, Las Vegas, NV (US)

(72) Inventor: Yuichiro Tsutsui, Tokyo (JP)

(*) Notice: Subject to any disclaimer, the term of this patent is extended or adjusted under 35 U.S.C. 154(b) by 0 days.

(21) Appl. No.: 16/357,240

(22) Filed: Mar. 18, 2019

(65) Prior Publication Data

US 2019/0213832 A1 Jul. 11, 2019

Related U.S. Application Data

(63) Continuation of application No. 14/869,898, filed on Sep. 29, 2015, now Pat. No. 10,235,838, which is a (Continued)

(51) Int. Cl.
*G07F 17/32* (2006.01)
*G06Q 20/04* (2012.01)
(Continued)

(52) U.S. Cl.
CPC ........ *G07F 17/3246* (2013.01); *G06F 3/0481* (2013.01); *G06F 3/04842* (2013.01);
(Continued)

(58) Field of Classification Search
CPC ........ G06Q 10/00; G06Q 20/00; G06Q 30/00; G06Q 40/00; G06Q 20/045; G06Q 20/18;
(Continued)

(56) References Cited

U.S. PATENT DOCUMENTS 5,265,874 A 11/1993 Dickinson et al.
5,275,400 A 1/1994 Weingardt
(Continued)

FOREIGN PATENT DOCUMENTS

CN 101044521 9/2007
JP 2004208820 7/2004
(Continued)

OTHER PUBLICATIONS

Carto et al., "Framework for Mobile Payments Integration" The Electronic Journal Information Systems Evaluation vol. 15 Issue 1, 2012 (pp. 13-24). (Year: 2012).*

*Primary Examiner* — Frantzy Poinvil
(74) *Attorney, Agent, or Firm* — FisherBroyles, LLP; Rob L. Phillips

(57) ABSTRACT

A voucher ticket system and method of use employing a bill validator installed into any suitable automated machine, including an Automated Teller Machine (ATM), a gaming machine, etc. The bill validator is integrated with a bill reader, a voucher ticket reader, a reader to obtain an electronic voucher ticket from a portable computing device, a printer, and any other supporting peripheral devices. The method processes a deposit, a withdrawal, a transfer and a management of a financial balance of each account. The electronic money handling terminal and the electronic money transaction server communicate through an electronic money handling terminal interface. Upon recognition of an electronic money account of a gaming player, the system receives a voucher ticket master ID issued by a voucher ticket management system at the cash-out, and proceeds with a cash out event to the electronic money account.

20 Claims, 24 Drawing Sheets

Related U.S. Application Data continuation-in-part of application No. 14/869,788, filed on Sep. 29, 2015, now Pat. No. 10,318,942, which is a continuation-in-part of application No. 14/494,629, filed on Sep. 24, 2014.

(51) Int. Cl.

| | | |
|---|---|---|
| H04W 4/80 | (2018.01) | |
| H04L 12/46 | (2006.01) | |
| H04L 12/403 | (2006.01) | |
| G07F 17/42 | (2006.01) | |
| G06Q 30/02 | (2012.01) | |
| G06Q 30/06 | (2012.01) | |
| G06Q 50/00 | (2012.01) | |
| H04L 12/24 | (2006.01) | |
| H04L 12/26 | (2006.01) | |
| G06F 3/0481 | (2013.01) | |
| G06F 3/0484 | (2013.01) | |
| H04W 4/12 | (2009.01) | |
| H04L 12/18 | (2006.01) | |
| G06Q 50/34 | (2012.01) | |
| G06Q 20/32 | (2012.01) | |
| G06Q 20/18 | (2012.01) | |

(52) U.S. Cl.
CPC .......... *G06Q 20/045* (2013.01); *G06Q 20/18* (2013.01); *G06Q 20/3278* (2013.01); *G06Q 30/0201* (2013.01); *G06Q 30/0241* (2013.01); *G06Q 30/0255* (2013.01); *G06Q 30/0261* (2013.01); *G06Q 30/0269* (2013.01); *G06Q 30/0271* (2013.01); *G06Q 30/0273* (2013.01); *G06Q 30/0275* (2013.01); *G06Q 30/0641* (2013.01); *G06Q 50/01* (2013.01); *G06Q 50/34* (2013.01); *G07F 17/3225* (2013.01); *G07F 17/3241* (2013.01); *G07F 17/42* (2013.01); *H04L 12/1813* (2013.01); *H04L 12/403* (2013.01); *H04L 12/4625* (2013.01); *H04L 41/12* (2013.01); *H04L 43/06* (2013.01); *H04W 4/12* (2013.01); *H04W 4/80* (2018.02)

(58) Field of Classification Search
CPC ............ G06Q 30/0201; G06Q 30/0241; G07F 17/3246; H04W 4/80; G06F 3/0481; G06F 3/0482
USPC .......................................... 705/3–44; 463/25
See application file for complete search history.

(56) References Cited

U.S. PATENT DOCUMENTS

| | | | |
|---|---|---|---|
| 5,290,033 A | 3/1994 | Bittner et al. | |
| 5,429,361 A | 7/1995 | Raven et al. | |
| 5,470,079 A | 11/1995 | LeStrange et al. | |
| 6,852,029 B2 | 2/2005 | Van Baltz et al. | |
| 6,905,411 B2 | 6/2005 | Nguyen | |
| 6,935,953 B2 | 8/2005 | Marcu | |
| 7,062,470 B2 | 6/2006 | Prasad et al. | |
| 7,419,428 B2 | 9/2008 | Rowe | |
| 7,516,882 B2 | 4/2009 | Cucinotta | |
| 7,611,409 B2 | 11/2009 | Muir et al. | |
| 7,653,599 B2* | 1/2010 | Doran ..................... | G06Q 20/10 705/41 |
| 7,699,703 B2 | 4/2010 | Muir et al. | |
| 8,332,213 B2* | 12/2012 | Gournay ............. | H03M 7/3082 704/219 |
| 8,550,900 B2 | 10/2013 | Walker | |
| 8,613,659 B2* | 12/2013 | Nelson ................ | G07F 17/3244 463/25 |
| 8,950,566 B2* | 2/2015 | Hallowell ............. | G06Q 99/00 194/206 |
| 9,105,141 B2 | 8/2015 | Okada et al. | |
| 9,530,277 B2* | 12/2016 | Nelson ................ | G07F 17/3211 |
| 9,544,010 B2 | 1/2017 | Lin et al. | |
| 9,564,010 B2 | 2/2017 | Page et al. | |
| 9,785,923 B2 | 10/2017 | Barsukov | |
| 9,972,168 B2 | 5/2018 | Sanford et al. | |
| 10,121,318 B2 | 11/2018 | LeMay et al. | |
| 10,235,838 B2 | 3/2019 | Tsutsui | |
| 10,235,839 B2 | 3/2019 | Tsutsui | |
| 10,242,523 B2* | 3/2019 | Lyons ................. | H04L 65/4069 |
| 2003/0078094 A1 | 4/2003 | Gatto et al. | |
| 2005/0071179 A1 | 3/2005 | Peters et al. | |
| 2006/0068897 A1 | 3/2006 | Sanford et al. | |
| 2008/0026826 A1 | 1/2008 | Groswirt | |
| 2008/0076528 A1 | 3/2008 | Nguyen et al. | |
| 2008/0125204 A1 | 5/2008 | Inamura | |
| 2011/0057028 A1 | 3/2011 | Schwartz | |
| 2012/0142403 A1 | 6/2012 | Prather et al. | |
| 2012/0290376 A1 | 11/2012 | Dryer et al. | |
| 2013/0065668 A1 | 3/2013 | LeMay | |
| 2013/0091055 A1 | 4/2013 | Doran et al. | |
| 2014/0121005 A1* | 5/2014 | Nelson ................ | G07F 17/3223 463/25 |
| 2014/0236694 A1 | 8/2014 | Tan et al. | |
| 2014/0323206 A1 | 10/2014 | Gagner et al. | |
| 2015/0087408 A1 | 3/2015 | Siemasko et al. | |
| 2015/0187177 A1 | 7/2015 | Warner et al. | |
| 2015/0228153 A1* | 8/2015 | Hedrick ............. | G06Q 20/3223 463/25 |
| 2015/0339654 A1 | 11/2015 | Warner et al. | |
| 2016/0027252 A1 | 1/2016 | Warner et al. | |
| 2016/0086145 A1 | 3/2016 | Tsutsui | |
| 2017/0323282 A1* | 11/2017 | Doran ..................... | G06Q 20/10 |
| 2018/0322735 A1* | 11/2018 | Warner ................. | G06Q 20/10 |
| 2019/0213833 A1 | 7/2019 | Tsutsui | |
| 2019/0272704 A1* | 9/2019 | LeMay ............... | G07F 17/3251 |

FOREIGN PATENT DOCUMENTS

| | | |
|---|---|---|
| JP | 2008132045 | 6/2008 |
| RU | 110202 | 11/2011 |
| RU | 2011133532 | 2/2013 |
| WO | WO2006/041614 | 4/2006 |
| WO | WO2006/041887 | 4/2006 |

* cited by examiner

ACCOUNT TABLE 1200

| ACCOUNT # 1210 | E-MONEY BALANCE ($) 1212 | MESSAGE DESTINATION 1220 | | OTHER 1224 |
|---|---|---|---|---|
| | | EMAIL 1222 | SMS | |
| A1 | $ 1406 | USER@EMAIL1.COM | 555-555-1210 | OTHER1 |
| B2 | $ 700 | USER@EMAIL2.COM | 555-555-1211 | OTHER2 |
| C3 | $ 2,350 | USER@EMAIL3.COM | 555-555-1212 | OTHER3 |
| D4 | $ 16,521 | USER@EMAIL4.COM | 555-555-1213 | OTHER4 |
| E5 | $ 4,279 | USER@EMAIL5.COM | 555-555-1214 | OTHER5 |
| n9 | $ 10 | USER@EMAIL9.COM | 555-555-1219 | OTHER9 |

STORED VOUCHER TICKET (TITO) TABLE — 1250

| ACCOUNT # — 1210 | TITO LOCAL-ID — 1260 | TITO MASTER ID — 1262 | TITO VALUE — 1264 | STATUS — 1266 | EXPIRATION — 1268 |
|---|---|---|---|---|---|
| A1 — 1230 | 0001 | 1010057Z | $ 57 | VALID | OCT 08, 2014 9:42:02 |
| B2 — 1232 | 0001 | 1201060R | $ 125 | VALID | DEC 25, 2014 18:21:14 |
| A1 — 1230 | 0002 | 0000036X | $ 5 | EXPIRED | JUL 23, 2014 14:05:07 |
| A1 — 1230 | 0003 | 3175041A | $ 1,800 | VALID | MAR 03, 2015 21:11:50 |
| C3 — 1234 | 0001 | 1278002P | $ 755 | INVALID | UNKNOWN |
| n9 — 1239 | 0001 | 3510547S | $ 2,100 | PENDING | PENDING |

*FIG. 22*

Stored Voucher Ticket (TITO) Table — 1270

| ACCOUNT # (1210) | TITO MASTER ID (1280) | MARKED (1282) | TIME STAMP (1284) |
|---|---|---|---|
| A1 (1230) | 1010057Z | AUG 30, 2014 | 14:36:11 |
| B2 (1232) | 1201060R | JUL 23, 2014 | 19:06:05 |
| A1 (1230) | 0000036X | JUL 14, 2014 | 20:54:09 |
| A1 (1230) | 3175041A | SEP 01, 2014 | 19:07:07 |
| C3 (1234) | 1278002P | AUG 29, 2014 | 16:08:24 |
| n9 (1239) | 3510547S | PENDING | PENDING |

*FIG. 23*

ELECTRONIC VOUCHER TICKET SYSTEM

CROSS REFERENCE TO RELATED APPLICATION

This is a continuation of U.S. patent application Ser. No. 14/869,898, filed Sep. 29, 2015, now U.S. Pat. No. 10,235,838 which is a continuation-in-part of U.S. patent application Ser. No. 14/869,788, filed Sep. 29, 2015, now U.S. Pat. No. 10,318,942 which is a continuation-in-part of U.S. patent application Ser. No. 14/494,629, filed Sep. 24, 2014, all of which are each incorporated herein by reference in their entireties.

FIELD OF INVENTION

This invention relates to a clearinghouse system for use with electronic vouchers issued by casino systems via electronic gaming machines (EGMs).

BACKGROUND OF THE INVENTION

Voucher tickets are utilized in the gaming industry for transactions. The voucher tickets include information required to complete secured transactions, including coded data provided in any suitable format, such as barcodes. Typically, a player will cash out after completing the gaming play, and the gaming machine will print a voucher ticket. The voucher ticket is identified by a voucher ID that is issued and managed by the casino voucher ticket system. The voucher ID is printed in a barcode and is associated with a printed validation code printed on the voucher ticket. The voucher ticket received by the player can be inserted into a second gaming machine to credit the machine or can be inserted into a payment kiosk to receive cash that is equivalent to the value of the printed voucher ticket.

Each property issues its own proprietary form of these voucher tickets. Therefore, a gaming patron playing games at a variety of casino properties will be issued voucher tickets from each of the variety of properties; each voucher ticket is property-specific so cannot be used at another property. The gaming patron must keep track of these numerous voucher tickets from different properties.

As previously mentioned, the voucher tickets are limited for use with one gaming company, and generally, limited for use with one specific facility. To ensure security, the voucher tickets are commonly encoded to a financial system that is proprietary to the gaming facility. The proprietary encoding is one method, which restricts the use of the voucher ticket to the associated issuing gaming facility. When the user desires to leave one gaming facility to play at a different gaming facility, this constraint imposes a requirement upon the user to cash in the voucher ticket prior to leaving the current gaming facility.

An object of the present invention is to provide a clearinghouse to manage vouchers from multiple properties. A multi-property clearinghouse has been proposed that connects the back end voucher servers from different properties. This proposal provides a solution to the user for converting a voucher ticket issued by a first gaming facility to a voucher ticket that would be accepted for use at a second gaming facility. However, this solution would require the cooperation of the multiple properties and of gaming regulators.

BRIEF SUMMARY OF THE INVENTION

The electronic payment system according to the present invention comprises a payment system for use in conjunction with automated gaming machines. The payment system enables completion of a financial transaction using an automated payment system integrated into the automated gaming machine. The automated payment system can be configured to accept paper currency, coins, credit cards, gaming facility issued cards, voucher tickets, and the like. The voucher tickets include a machine-readable code and can be presented as a printed document, an image displayed upon a portable computing device (such as a smartphone, a tablet computer, a personal data assistant, a portable electronic gaming device, a proprietary gaming company issued computing device, and the like), and the like.

The electronic payment system comprises three distinct components: (a) a digital or electronic financial server and associated system, (b) a bill validator capable of reading and issuing digital image voucher tickets and preferably reading and issuing paper voucher tickets, wherein the bill validator is in data communication with the digital or electronic financial server, and (c) a gaming machine in data communication with the digital or electronic financial server.

In accordance with one embodiment of the present invention, the invention includes a method of transferring a value of a first gaming facility issued voucher ticket to a second gaming facility issued voucher, wherein the first gaming facility is independent of the second gaming facility, the method comprising the steps:

obtaining an originating voucher ticket having a financial value and an originating voucher ticket reference for determining said financial value, wherein said voucher ticket is issued by and associated with a first gaming facility;

storing said originating voucher ticket financial value and said originating voucher ticket reference on a first gaming facility financial server;

reading said reference from said originating voucher ticket;

determining said financial value of said originating voucher ticket by using said reference read from said originating voucher ticket and communicating with said first gaming facility financial server;

entering a desired second issuing gaming facility, wherein said second issuing gaming facility differs from said first gaming facility;

establishing a reference associated with a financial value of a replacement voucher ticket;

storing said replacement voucher ticket financial value and said replacement voucher ticket reference on a second gaming facility financial server;

issuing said replacement voucher ticket comprising said replacement voucher ticket reference.

In a second aspect, the voucher ticket includes a machine-readable image, wherein the machine-readable image provides a financial value associated with the voucher ticket.

In another aspect, a value associated with each voucher ticket is recorded on a digital or electronic financial system database server. Each player would be assigned one or more e-money accounts. The e-money accounts can be associated with one or more voucher tickets. The financial value of the electronic or digital voucher tickets can be increased or decreased by transferring money between the digital voucher ticket and the e-money account accordingly.

In yet another aspect, the method maintains a coexistence between a legacy player's card arrangement and a player's e-money account, wherein the player's e-money account is associated with the electronic or digital voucher ticket.

In another aspect, a serial number or other reference and a value associated with each voucher ticket are recorded on a financial system database. The serial number or other reference can be a numeric arrangement, an alphanumeric arrangement, and can include or exclude additional ASCii characters.

In another aspect, the voucher ticket includes a machine-readable image, wherein the machine-readable image provides a serial number, wherein the serial number is associated with the financial value and the financial value is determined by submitting an inquiry and obtaining a result from a financial system database.

In yet another aspect, the voucher ticket can include a machine-readable image further comprising at least one of: a financial value of the associated voucher ticket, an issue date, an expiration date, a name of the associated gaming facility, a logo of the associated gaming facility, a serial number identifying the voucher ticket, and the like.

In yet another aspect, the machine-readable image is printed upon a paper substrate forming a paper voucher ticket.

In yet another aspect, the machine-readable image is downloaded to a portable computing device in a form of a digital image and presented as an image on a display panel.

In yet another aspect, the voucher ticket issuance machine provides at least one of the paper voucher ticket and the machine-readable digital image, and preferably provides voucher tickets in both formats.

In yet another aspect, when the voucher ticket issuance machine determines an error occurred with transfer of the machine-readable digital image voucher ticket, the voucher ticket issuance machine would issue the paper voucher ticket.

In yet another aspect, the machine-readable image presented on a first voucher ticket associated with a first gaming facility is read and decoded determining an associated financial value and the financial value is transferred to a replacement voucher ticket associated with a second gaming facility.

In yet another aspect, the machine-readable image presented on a first voucher ticket associated with a first gaming facility is read and decoded determining an associated a financial value and the financial value is transferred to a replacement voucher ticket associated with a second gaming facility, wherein the revised associated financial values are electronically communicated to each of the respective gaming facility financial systems.

In yet another aspect, the machine-readable image presented on a first voucher ticket associated with a first gaming facility is read and decoded determining an associated financial value and the financial value is transferred to a replacement voucher ticket associated with a second gaming facility, wherein the first voucher ticket is provided in a first form factor and the second voucher ticket is provided in a second form factor and the first form factor differs from the second form factor.

In yet another aspect, each machine-readable image is encoded and deciphered in accordance with a security encoding schematic provided by the respective gaming facility.

In yet another aspect, the voucher ticket further comprises a human legible image presenting of at least one of a financial value of the associated voucher ticket, an issue date, an expiration date, a name of the associated gaming facility, a logo of the associated gaming facility, a serial number identifying the voucher ticket, and the like.

In yet another aspect, the present invention further comprises a method of cashing out at least a portion of the voucher ticket. In one embodiment, a balance of the voucher ticket can be provided to the user by a newly issued voucher ticket associated with the same associated gaming facility. Alternatively, the balance of the voucher ticket can be transferred to a newly issued replacement voucher ticket associated with the second gaming facility.

In yet another aspect, the method further comprises a step of validating authenticity of the voucher ticket by submitting an inquiry to the financial system database.

In yet another aspect, the method further comprises a step of obtaining information from the voucher ticket using a digital imaging system integrated into the voucher ticket reader.

In yet another aspect, the method further comprises a step of obtaining information from the voucher ticket using wireless signal communication between a voucher ticket reader and the portable computing device.

In yet another aspect, the method introduces a voucher ticket marking system. The marker would identify a date and time of the most recent activity.

These and other aspects, features, and advantages of the present invention will become more readily apparent from the attached drawings and the detailed description of the preferred embodiments, which follow.

BRIEF DESCRIPTION OF THE DRAWINGS

The above-mentioned and other objects and advantages of the present invention will be apparent from the following description in connection with the accompanying drawings showing gaming machines as preferred embodiments of the electronic payment system of the invention wherein:

FIG. 21 presents an exemplary digital or electronic financial account table representative of a component of a electronic financial account database;

FIG. 22 presents an exemplary stored voucher ticket status table representative another component of the electronic financial account database;

FIG. 23 presents an exemplary stored voucher ticket marking table representative another component of the electronic financial account database.

BEST MODE FOR CARRYING OUT THE INVENTION

Figure 1:
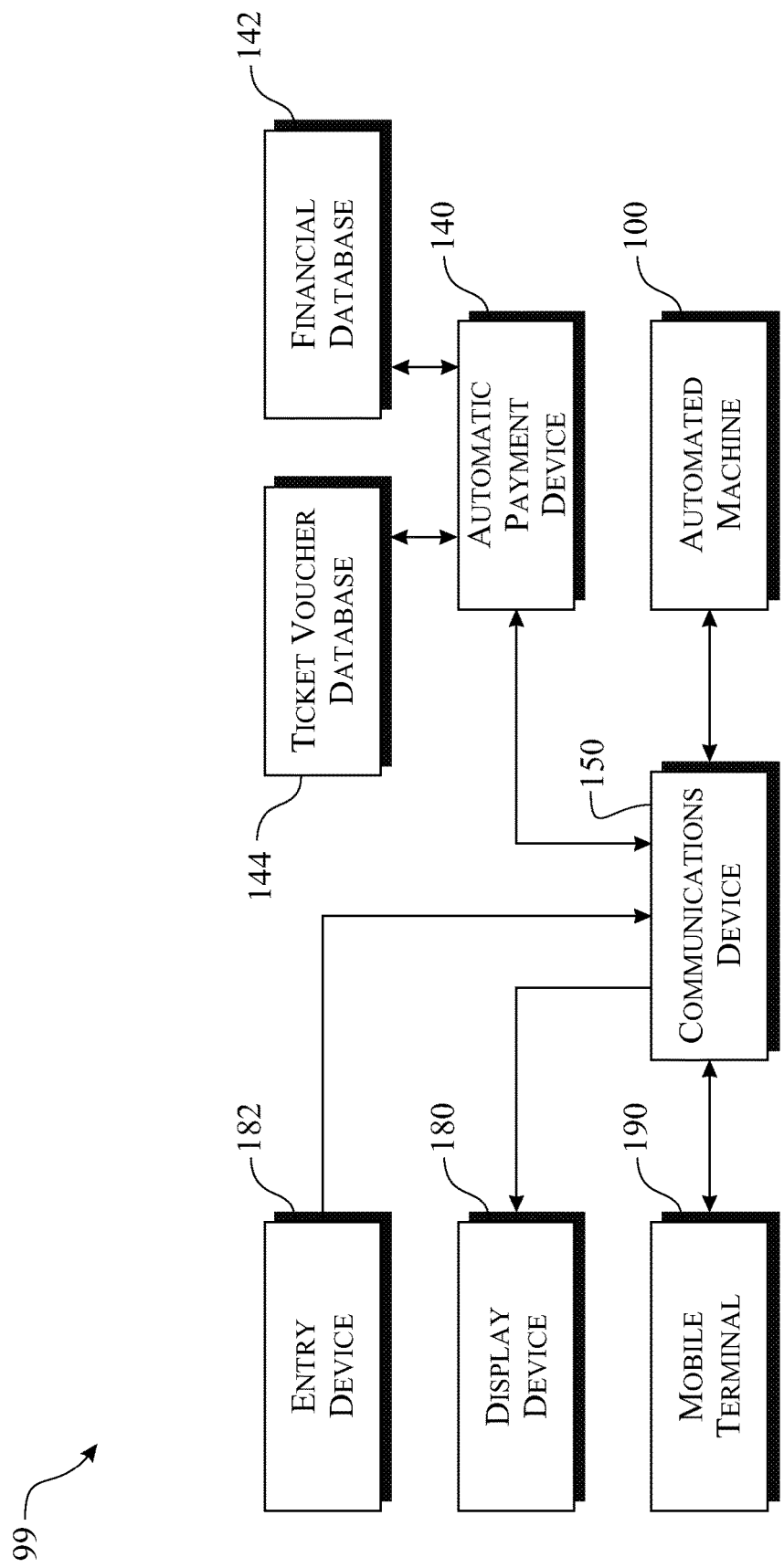
FIG. 1 presents an exemplary schematic diagram illustrating a basic concept of the electronic payment system according to the present invention.
Figure 2:
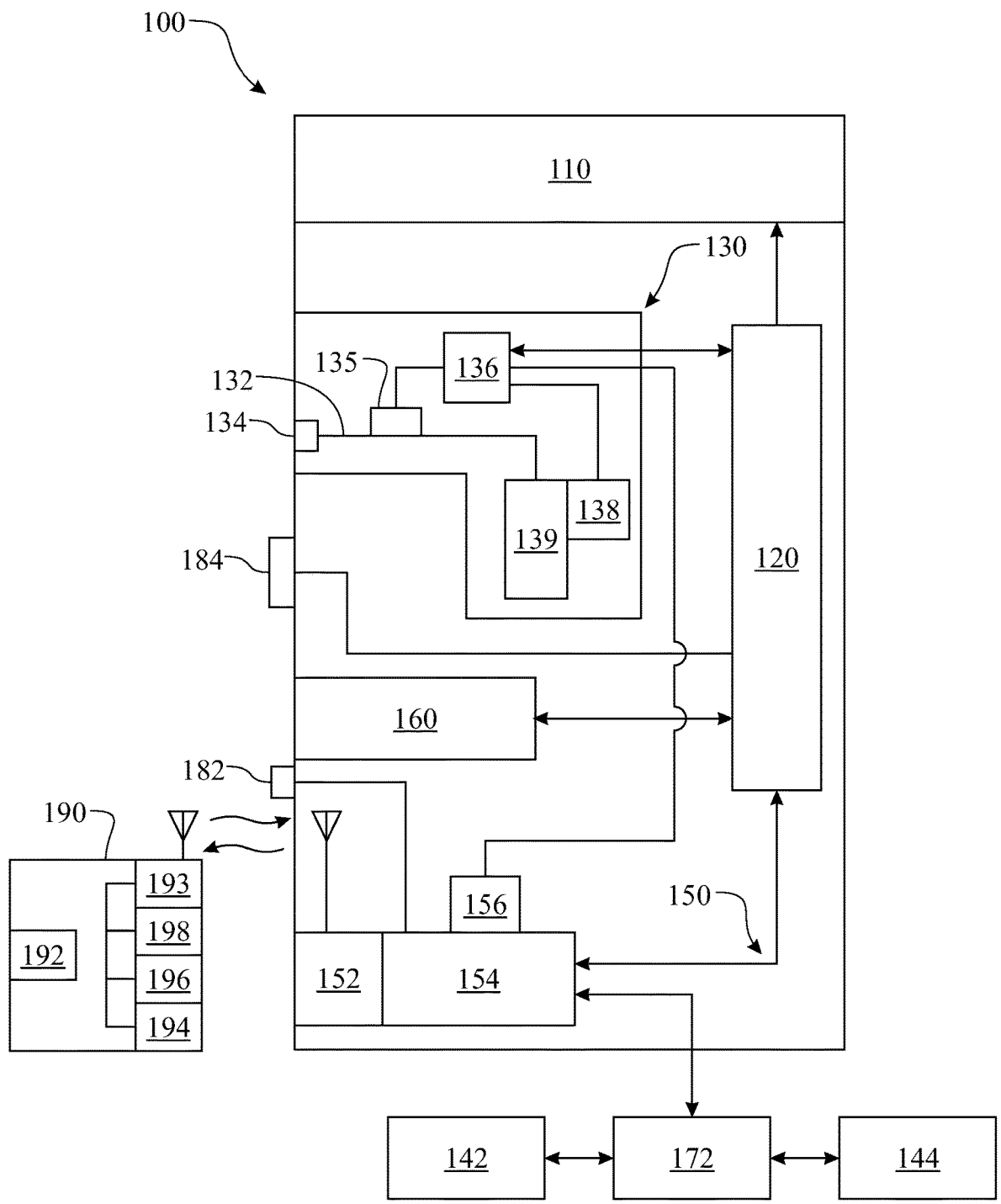
FIG. 2 presents a schematic diagram illustrating an exemplary embodiment of a gaming machine of prepaid card transaction type in accordance with the present invention.

A basic concept of an electronic payment system 99, according to the present invention, is presented in FIG. 1 with details of a portion of the components being presented in FIG. 2. The exemplary electronic payment system 99 comprises a mobile terminal 190 for emitting and/or receiving a remotely operable signal that may include information on a specific or unique account number or a debit card number associated with a financial database 142. The unique account number or a debit card number identifies an account owned by a holder thereof. The electronic payment system 99 also comprises a communications device 150 provided in signal communication with an automated machine 100 for receiving a remotely operable signal emitted from the mobile terminal 190. The communications device 150 can also receive a monetary signal indicative of a transaction fee necessary to drive the automated machine 100 simultaneously with, before, or after receiving the remotely operable signal. When the remotely operable signal contains a monetary signal, the communications device 150 can receive the encoded information respective to account number and the monetary signal contained in the remotely operable signal transmitted from the mobile terminal 190. Alternatively, the monetary signal can be produced and transmitted to the communications device 150 by another signal input device such as an entry device 182, which will be described below. The holder of the financial account usually is a same individual that owns the mobile terminal 190, however, the holder might be a different person from the owner of the mobile terminal 190. The mobile terminal 190 can be any portable computing device comprising a wired or wireless communication system compatible with the communication system and respective protocol of the communications device 150.

Then, the communications device 150 may retrieve the holder's account number from the financial database 142 and the monetary signal if they are contained in the remotely operable signal. The electronic payment system 99 may also comprise an automatic payment device 140 linked to the financial database 142 for receiving a transmitted signal from the communications device 150, the holder's account number signal from the financial database 142 and the monetary signal of the transaction fee and for withdrawing an amount of transaction fee from the correct holder's account at the financial database 142 to produce an authorization signal, wherein the authorization signal is only provided in a condition where the received account number is correct and the amount of transaction fee is within a deposit balance of the account. Upon receipt of the authorization signal, the communications device 150 produces a monetary signal to the automated machine 100 to drive it at the amount equivalent to a value of received monetary signal.

The mobile terminal 190 may emit a remotely operable signal, such as a radio or other wireless signal; an optical beam signal of infrared, ultraviolet or visible ray; and the like, to interact with the remotely operable signal by communications device 150. The mobile terminal 190 and communications device 150 are electrically connected to each other through a wired or a wireless mutual communication interface for radio or optical connection. The mobile terminal 190 also may include a cellular phone, a smart phone utilizing wireless application protocol (WAP), a personal digital assistant (PDA), a portable computer, a hand held computer for electronic payment through the debit or prepaid card transaction system, or the like. A debit card transaction system may include J-Debit, VISA Debit and Debit Master. Prepaid card transaction systems may include Eddy, Suica, PASMO, nanaco, and WAON. The aforementioned systems and devices are exemplary and the mobile terminal 190 may comprise ones for other electronic payment systems 99 or devices. Also, the mobile terminal 190 may be an electronic computer terminal or a smart card, chip card, or integrated circuit card (commonly referred to as an IC card) that incorporates a built-in non-contact IC chip such as for example FeliCa (Registered Mark), MIFARE (Registered Mark) or NFC (Near Field Communication) chips.

Figure 3:
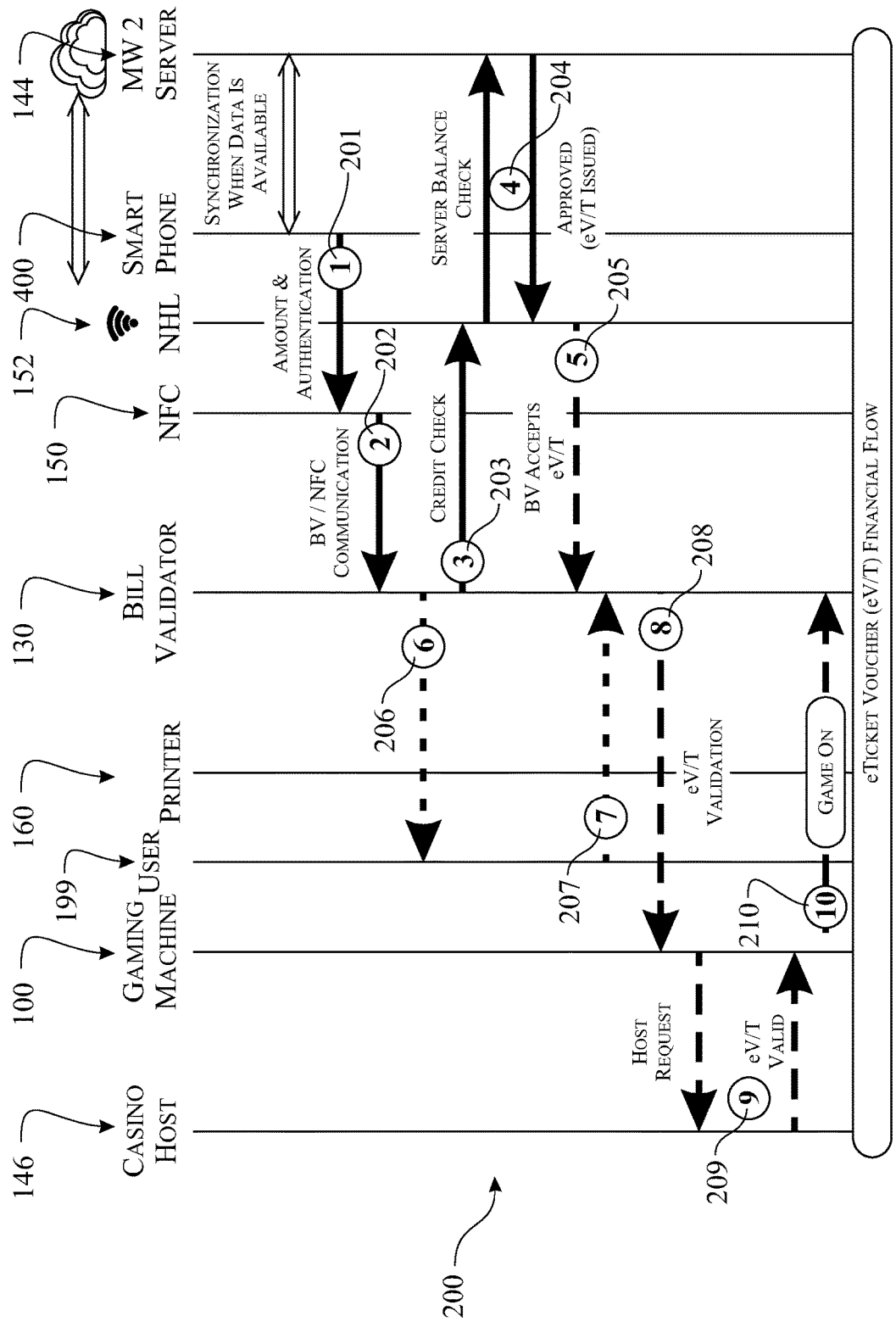
FIG. 3 presents a schematic diagram detailing an exemplary cash to electronic voucher ticket (eV/T) process, initiating play at the electronic gaming machine.

The automatic payment device 140 can additionally incorporate elements for reading and generating voucher tickets 310, 410 (FIG. 3). The voucher tickets 310, 410 can be in any suitable form factor, including a paper voucher ticket 310 and an electronic voucher ticket 410. The information associated with the voucher ticket 310, 410 would be obtained using elements respective to the form factor of the voucher ticket 310, 410. For example, the automatic payment device 140 would include a scanner for reading a paper voucher ticket 310 and/or a camera for reading an image displayed upon an electronic voucher ticket 410. An additional option would be the use of the mobile terminal 190 to wirelessly communicate with a portable computing device 400 (FIG. 3) to provide a wireless communication interface therebetween to obtain data associated with the electronic voucher ticket 410.

Details of the mobile terminal 190 are presented in FIG. 3. The mobile terminal 190 comprises a digital storage device 193 such as an integrated digital storage media, a removable digital storage, or both. The digital storage device 193 can be provided in any suitable format, including a memory card, flash memory, and the like removably insertable or integrated within a cellular phone for storing code information that includes an account number of a holder's debit or prepaid card, PIN (Personal Identification Number) and/or ID (Identification) number, a user entry device 194 such as a physical numerical keypad, a physical keyboard, a graphical user interface generated numerical keypad or alpha-numeric keypad in cellular phone for inputting an amount of a transaction fee signal such as gaming fees into digital storage device 193, a Central Processing Unit (CPU) 192 electrically connected to all electronic circuits and electronic functional systems for preparing a remotely operable signal inclusive of the code information stored from digital storage device 193, the wireless transmitting system 196 for transmitting remotely operable signal from CPU 192 to communications device 150, the wireless signal receiving system 198 for receiving a deal signal from the communications device 150 when communications device 150 transmits to mobile terminal 190 the deal signal produced by communications device 150, and a portable power supply (such as a battery, super capacitor, and the like), (not shown) for supplying electric power to each electrically operated device or circuit to perform the various reading, writing, transmitting and receiving functions in mobile terminal 190. The digital storage device 193 does not need to store the code information for enhancement in security as any code signals may be produced by user entry device 194 and transmitted outside through wireless transmitting system 196. A single convertible transceiver circuit can be used for both the transmission and reception functions 196, 198. The CPU 192 can prepare the remotely operable signal that contains a transaction fee signal and a code signal inclusive of account number of debit or prepaid card, a PIN (Personal Identification Number) and/or an ID (Identification) number.

Returning to FIG. 1, there are a variety of automated machines for receiving transaction fee signal from the communications device 150, wherein the automated machines may include automated teller machines (ATM), vending machines, money exchangers, gaming machines, or other money-operated equipment or apparatus. The present invention adopts a gaming or automated machine 100 as an example of automated machines, however, it would be apparent to ordinary skill in the art that the electronic payment system 99 of the present invention can also apply to drive other financially driven, automated machines in a similar way.

The communications device 150 and automatic payment device 140 are electrically linked to each other through a wired, a wireless connection, an Intranet connection, an Internet protocol, or any combination thereof. The automatic payment device 140 and the financial database 142, such as banking systems are linked to each other through a wired, a wireless connection, an Intranet connection, an Internet protocol, or any combination thereof. In embodiments of the present invention, the communications device 150 can be disposed within, outside of, or adjacent to the gaming or automated machine 100 so far as users may operate the mobile terminal 190 to access communications device 150 in the vicinity of or at a location not too distant from the gaming or automated machine 100. Both the communications device 150 and the automatic payment device 140 may be disposed within or outside of the gaming or automated machine 100 for any spatial reason, so far as users may easily access the gaming or automated machine 100 and operate the communications device 150. For a similar reason, one of the communications device 150 and the automatic payment device 140 can be disposed within or outside of gaming or automated machine 100 so far as they may be provided in signal communication with one another.

The communications device 150 comprises a signal processor 154 connected to automated machine 100 for retrieving and producing an account number that identifies a holder of the account at financial database 142 and if necessary holder's PIN and/or ID numbers and monetary signals from remotely operable signal received from mobile terminal 190, and a communications interface 152 for intervening telecommunication between mobile terminal 190 and signal processor 154.

A typical example of the automated machine applied to a schematically depicted gaming or automated machine 100 is illustrated in FIG. 2. The gaming or automated machine 100 comprises a bill acceptor 130, a drive device 120 connected to the communications device 150, and to gaming hardware 110 and a printer 160 for recording game information on a recording medium. The bill acceptor 130 validates a bill inserted therein from outside to produce a bill monetary signal to drive device 120 as a monetary signal of transaction fee when bill acceptor 130 decides that the inserted bill is genuine. The drive device 120 generates drive signals of the amount equivalent to a value of received monetary signal to present games when receiving each monetary signal from the bill acceptor 130. The drive signals are forwarded to the gaming hardware 110. The printer 160 prints onto a recording medium, data of the game information, money amount to be refunded and management codes to issue the recording medium as a coupon.

The bill acceptor 130 comprises an inlet sensor 134 for producing a detection signal when a bill is inserted into bill acceptor 130, a bill sensor 135 for producing a characteristic signal inclusive of an optical or magnetic signal when a bill is moved along bill sensor 135, a conveyor (not shown) for transporting a bill along a passageway 132 in bill acceptor 130 and a control device 136 for receiving detection signal from inlet sensor 134 and characteristic signal from bill sensor 135 to produce drive signals to conveyor when control device 136 considers the bill as being genuine. Specifically, control device 136 may verify whether or not the bill is genuine and what kind of denomination the bill has, and when it decides that the bill is genuine, the control device 136 generates a denomination signal of the bill as a digital monetary signal, wherein the signal is communicated to the drive device 120. On the other hand, the control device 136 also receives from the communications device 150, the monetary signal sent from the mobile terminal 190, and so, transmits to the drive device 120 either of the monetary signals that bill acceptor 130 produces and relays from the communications device 150. The control device 136 is provided in electrical communication to a converter 156 of the communications device 150 for converting the denomination signal from the signal processor 154 into a serial denomination signal and transmitting the serial denomination signal to the control device 136 of the bill acceptor 130. The control device 136 has a memory area for storing a specific code, such as an electronic serial number, identifying the specific gaming or automated machine 100 and also storing both monetary signals that the bill acceptor 130 produces and relays from the communications device 150. Otherwise, the present invention also contemplates that the bill acceptor 130 can validate valuable coupon tickets, scrip, tender, tokens or substitutes of bills.

The bill acceptor 130 validates a bill inserted from outside to produce a monetary signal representative of the valuation of the bill to the drive device 120 when the bill acceptor 130 determines the value of the inserted bill and that the inserted bill is genuine. The bill acceptor 130 also receives a monetary signal contained in the remotely operable signal from the signal processor 154 through the converter 156 of the communications device 150, and forwards the monetary signal to the drive device 120. Then, the drive device 120 receives either of the monetary signals from the bill acceptor 130 to generate to the gaming hardware 110 the drive signals having the amount equivalent to a value of either of the received monetary signal(s) to allow the gaming hardware 110 to conduct a game. Each of monetary signals may indicate a financial value corresponding to one or more denominations of bills optically or magnetically readable by the bill acceptor 130. In other words, the financial value or money amount to be transmitted may be selected from amounts in denominations of bills readable by the bill acceptor 130. By way of example, when the bill acceptor 130 can selectively validate bills of five kinds, i.e. one-dollar, five-dollar, ten-dollar, twenty-dollar or one hundred-dollar bills, it would be preferable to send signals of the amount selected from one-dollar, five-dollar, ten-dollar, twenty-dollar or one hundred-dollar bill from the mobile terminal 190 to the communications device 150.

The drive device 120 can generate to the gaming hardware 110, drive signals having the amount equivalent to a value of the received monetary signal when receiving the monetary signal through the bill acceptor 130. Otherwise, the communications device 150 may forward the monetary signal of the transaction fee directly to the drive device 120 without the bill acceptor 130 so that the drive device 120 may produce to the gaming hardware 110 the respective drive signals having the amount equivalent to the amount of transaction fee to drive the gaming hardware 110 by drive signals from the drive device 120. This allows users to select either a cash payment or a cashless electronic payment for gaming in amusement halls or casinos.

The bill acceptor 130 also comprises a stacker 139 for accommodating bills considered genuine by the control device 136, and a memory device 138 in electrical communication with the control device 136 and attached to the stacker 139 for storing monetary or denomination signals, account number signals, PIN and ID number signals and specific code signal identifying the gaming or automated machine 100 forwarded from the control device 136. The control device 136 distinctively stores in the memory area both monetary signals produced by the control device 136 and transmitted from the communications device 150. The memory device 138 distinctively stores both monetary signals transmitted from both the control device 136 and the communications device 150, account number signals, PIN and ID number signals and specific code signal identifying the gaming or automated machine 100; all forwarded from the control device 136. The bill acceptor 130 is removably attached to the gaming or automated machine 100 and also the stacker 139 is removably attached to the bill acceptor 130 to easily take out and collect bills accumulated within the stacker 139. Accordingly, when the bills accumulated within the stacker 139 are to be collected, the bill acceptor 130 is detached from gaming or automated machine 100 and then the stacker 139 is removed from the bill acceptor 130.

In operation, when the mobile terminal 190 moves closer to the communications device 150, the mobile terminal 190 emits a radio signal inclusive of the account number signal of financial database 142 identifying a holder of the account and transaction fee signal to be paid for operation of gaming or automated machine 100. Subsequently, the communications device 150 receives a radio signal to retrieve the holder's account number embedded within the radio signal and also receive a monetary signal indicative of the transaction fee that may be involved in the radio signal. Alternatively, the communications device 150 may be connected to an entry device 182 for inputting a monetary signal of a transaction fee for the gaming or automated machine 100 to transmit monetary signal from the entry device 182 to the communications device 150. Then, the automatic payment device 140 can receive monetary signal from the entry device 182 through the communications device 150 simultaneously with, before, or after receiving the radio signal from the mobile terminal 190. Then, just like through an on-line debit or prepaid card system, the automatic payment device 140 can withdraw the financial equivalent of the transaction fee from the holder's account at the financial database 142 when the amount of transaction fee is within a deposit balance of the holder's account. Then, the automatic payment device 140 produces an authorization signal to the communications device 150 that then sends the monetary signal to the gaming or automated machine 100 to drive it.

In another embodiment of the present invention, remotely operable signal may include PIN and/or ID numbers to more strictly identify the holder in addition to the holder's account number of the mobile terminal 190 to increase security against unauthorized access to the holder's account. When the mobile terminal 190 emits a radio signal inclusive of account number and PIN and/or ID number, the communications device 150 can receive the radio signal, retrieve or decipher the account number, the PIN and/or ID numbers from the radio signal and withdraw the amount of transaction fee from the holder's account at the financial database 142 when PIN and/or ID numbers correspond to one or ones of pass-codes or secret numbers stored within the financial database 142. In lieu of the PIN and/or ID number included in radio signal, the entry device 182 can be used to produce the PIN and/or ID number signals from the entry device 182 connected to the communications device 150 to provide them to the automatic payment device 140 through the communications device 150 so that the automatic payment device 140 can withdraw the amount of transaction fee from the holder's account at the financial database 142 when the PIN and/or ID numbers correspond to one or ones of pass-codes or secret numbers at financial database 142.

In a further embodiment of the instant invention, the communications device 150 can be connected to a visual and/or acoustic display device 180. When communications device 150 receives an authorization signal from the automatic payment device 140, the communications device 150 produces and transmits a deal signal to the mobile terminal 190 and/or to the display device 180 to exhibit the deal signal thereon. On another aspect, when the communications device 150 fails to retrieve the account number embedded within the radio signal or retrieves an incorrect account number, the automatic payment device 140 produces an unauthorized signal to the communications device 150 that, then produces and forwards a no-deal signal to the mobile terminal 190 and/or to display device 180 for exhibition of no-deal signal.

For example, when the drive device 120 has completed its program-controlled operation or when a force-quit button 184 is actuated to terminate the game, the drive device 120 generates a refund money signal of an unspent remaining financial balance, award, prize, jackpot, or the like obtained from the game if any. The drive device 120 may transmit a refund money signal and a management code signal to the printer 160 and also to the signal processor 154 of the communications device 150 to store the financial value to be refunded in the signal processor 154. The signal processor 154 may also transmit the refund money signal to the wireless signal receiving system 198 of the mobile terminal 190 through the communications interface 152 so that the mobile terminal 190 may receive and write the refund money signal in the digital storage device 193 of the mobile terminal 190 to add the financial value in the digital storage device 193. The printer 160 may record data as directed by the refund money signal and the necessary management code signals from the drive device 120 on the recording medium or media and prepares a coupon of the recording media for dispensation of the coupon from printer 160. In this way, a mutual intercommunication system may be established to transport and receive electronic signals between the mobile terminal 190 and the signal processor 154 through wired, wireless or radio, optical connection, or the like. Specifically, the communications interface 152 may receive the remotely operable signal from the mobile terminal 190, and transmit it to the signal processor 154 that may receive the remotely operable signal from the communications interface 152. The signal processor 154 can also retrieve and produce signals of the account number or debit card number for identifying the account owner or holder and the holder's PIN and/or ID number and monetary signals or a denomination signal contained in the remotely operable signal and, can then, send the information to the automatic payment device 140.

After or before bills are extracted from the stacker 139, it is put on a readout device 170 as shown in FIG. 3, but the memory device 138 attached to the stacker 139 is retained in the non-contact condition away from the readout device 170 that may be operated to retrieve the following four kinds of information stored in the memory device 138:

(i) Total amount and total number of bills stowed in stacker 139;
(ii) All denomination signals of the bills;
(iii) All account numbers that identify account holders involved; and
(iv) The specific code signal identifying gaming or automated machine 100 from which the stacker 139 has been removed.

The information readout device 170 has retrieved from the memory device 138 is compared with the information of the bills removed from the stacker 139 and with the information from the communications device 150 to inspect whether or not they match.

In still another embodiment, the gaming or automated machine 100 can comprise an entry device made up of a plurality of choice switches, namely an entry device 182 such as image switches (commonly referred to as soft switches or a graphical user interface) on a touch display screen or made up of mechanical selector switches to be chosen to determine a denomination of bills for payment for games so that one or more of choice switches may be selected to determine one or more of different charge amounts to be paid for gaming to transmit one or more charge or denomination signals to signal processor 154 of communications device 150. On the other hand, when mobile terminal 190 transmits to the communications device 150 remotely operable signal including holder's account number signal, the communications interface 152 may receive the account number signal from the mobile terminal 190, and the signal processor 154 may receive a chosen charge signal from the entry device 182 and the holder's account number signal transmitted from the mobile terminal 190.

In operation of the gaming or automated machine 100, a user may select either cash or electronic payment as a method for payment for playing games with the gaming or automated machine 100. In order to select the electronic payment option, he or she may operate the user entry device 194 of the mobile terminal 190 to input the money amount of the gaming fees into the Central Processing Unit (CPU) 192 that may synthesize a remotely operable signal by placing on a carrier wave the financial value of the gaming fees and the account number signal stored in the digital storage device 193 and then transmit remotely the operable signal to the communications device 150 through the wireless transmitting system 196. In this way, the user may move closer to the gaming or automated machine 100 and allow the mobile terminal 190 to lightly touch the communications interface 152 while making the mobile terminal 190 produce and transmit the remotely operable signal from the mobile terminal 190.

Figure 6:
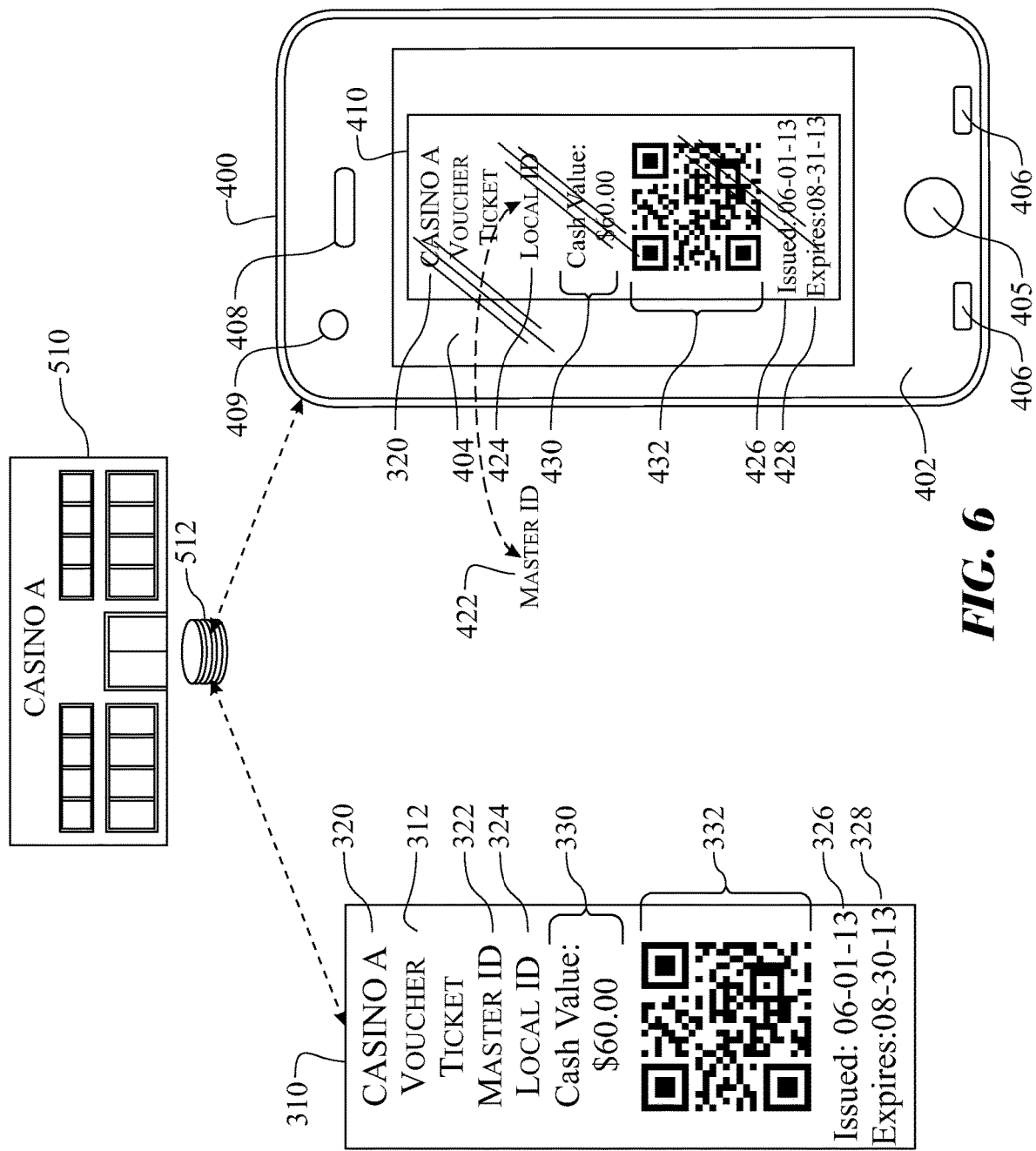
FIG. 6 presents a schematic diagram illustrating an exemplary electronic financial system utilizing printed voucher tickets and/or electronic voucher tickets.

A first financial process flow diagram 200 is presented in FIG. 3. The financial process flow diagram 200 presents a general interaction between contributing elements utilizing an electronic voucher ticket (eV/T in the diagrams) 310, 410 (FIG. 6) for financial processing in conjunction with an electronic gaming machine 100. The various contributing elements include the electronic gaming machine 100, a casino host server 146, at least one printer 160, a bill validator 130 (or other electronic voucher ticket reader), a near field communications device 150, and a mobile wallet server 144. The process initializes with the user 199 submitting a request for tendering payment for credits for use in conjunction with the electronic gaming machine 100. The user 199 enters an amount and necessary information for authorization for the transaction using an application provided on a Smartphone 400 (step 201). The data is received by wireless communication between the smartphone 400 and the near field communicator 150 as indicated by step 201. The near field communicator 150 forwards the information to the bill validator 130 as referenced in step 202. The bill validator 130 completes a credit check or any other associated transaction validation process (step 203). The system utilizes technology referred to as Network Hub Link (NHL) 158 to communicate with and complete transactions with the mobile wallet server 144. The communication process completes a balance check for available funds and provides feedback to the bill validator 130 as indicated by steps 204 and 205. During this process, an electronic or electronic voucher ticket (eV/T) 410 is issued. In parallel, the bill validator 130 communicates the outcome of the request (accepted or denied) to the user 199 (step 206). Should the user desire to begin play on the automated machine 100, the user 199 enters the electronic voucher ticket 410 into the bill validator 130 associated with the automated machine 100 (step 207). The electronic voucher ticket 410 can be read by the bill validator 130 using any suitable technology associated with the form factor of the electronic voucher ticket 410, including a camera to view an electronic voucher ticket 410 displayed upon a smartphone display 404, an near field communicator 150 to read wirelessly transfer information from the smartphone 400, and the like. The automated machine 100 digitally conveys the transaction to the gaming facility host server 146 (step 208). The gaming facility host server 146 in turn, provides feedback to the automated machine 100 on whether the electronic voucher ticket 410 is accepted or rejected (step 209). In a condition where the electronic voucher ticket 410 is accepted, credit is applied to the automated machine 100 and the user 199 begins play thereon (step 210).

Figure 4:
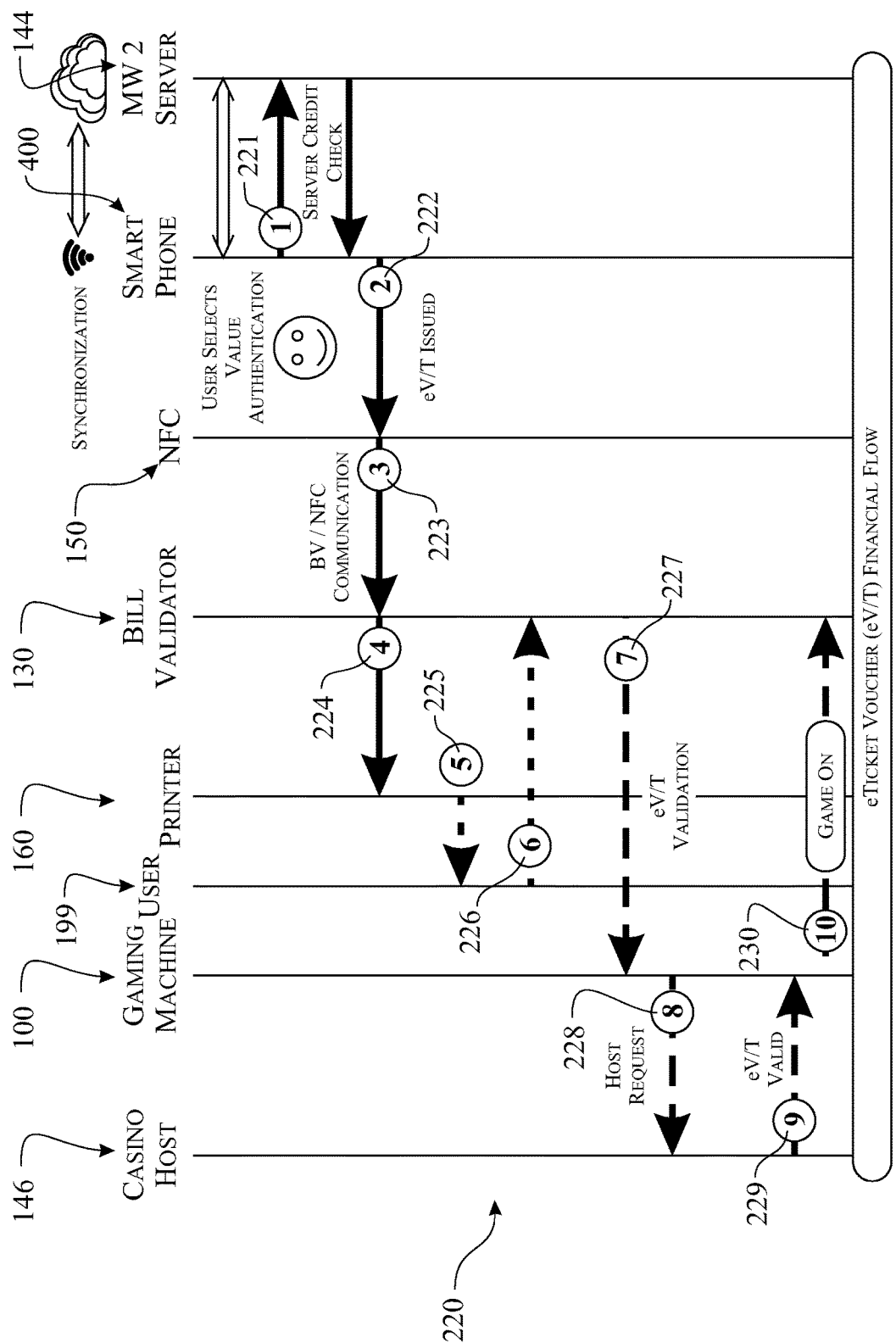
FIG. 4 presents a schematic diagram detailing an exemplary paperless electronic voucher ticket (eV/T) process.

A first alternative process for utilizing mobile wallet is presented in an alternative financial process flow diagram 220 is presented in FIG. 4. The financial process flow diagram 220 presents a general interaction between contributing elements utilizing the electronic voucher ticket (eV/T in the diagrams) 310, 410 (FIG. 6) for financial processing in conjunction with the electronic gaming machine 100. The various contributing elements include those previously described in FIG. 3, excluding the as Network Hub Link (NHL) 158. The process initializes with the user 199 submitting a request for tendering payment for issuance of credits onto the electronic voucher ticket 410 (step 221). The user 199 enters an amount and necessary information for authorization for the transaction using an application provided on the smartphone 400. The data is received by the mobile wallet server 144 using wireless communication between the smartphone 400 and the mobile wallet server 144. The mobile wallet server 144 issues and forwards the electronic voucher ticket 410 to the Smartphone 400 (step 222). Upon request by the user, the smartphone 400 communicates information associated with the electronic voucher ticket 410 to the bill validator 130 via the near field communications device 150 (step 223). The bill validator 130 can optionally transfer a request to print a paper voucher ticket 310 (FIG. 6) to the printer 160 (step 224). The paper voucher ticket 310 is dispensed and provided to the user 199 (step 225). The user 199 enters either the paper voucher ticket 310 or the electronic voucher ticket 410 into the bill validator 130 for use with an associated automated machine 100 (step 226). The bill validator 130 forwards information directly or indirectly to the gaming facility host server 446 (steps 227 and 228). The gaming facility host server 446 either confirms or rejects a validation of the electronic voucher ticket 410 and reports the validation status (either approved or rejected) to the automated machine 100 (step 229). In a condition where the electronic voucher ticket 310, 410 is accepted, credit is applied to the automated machine 100 and the user 199 begins play thereon (step 230).

Figure 5:
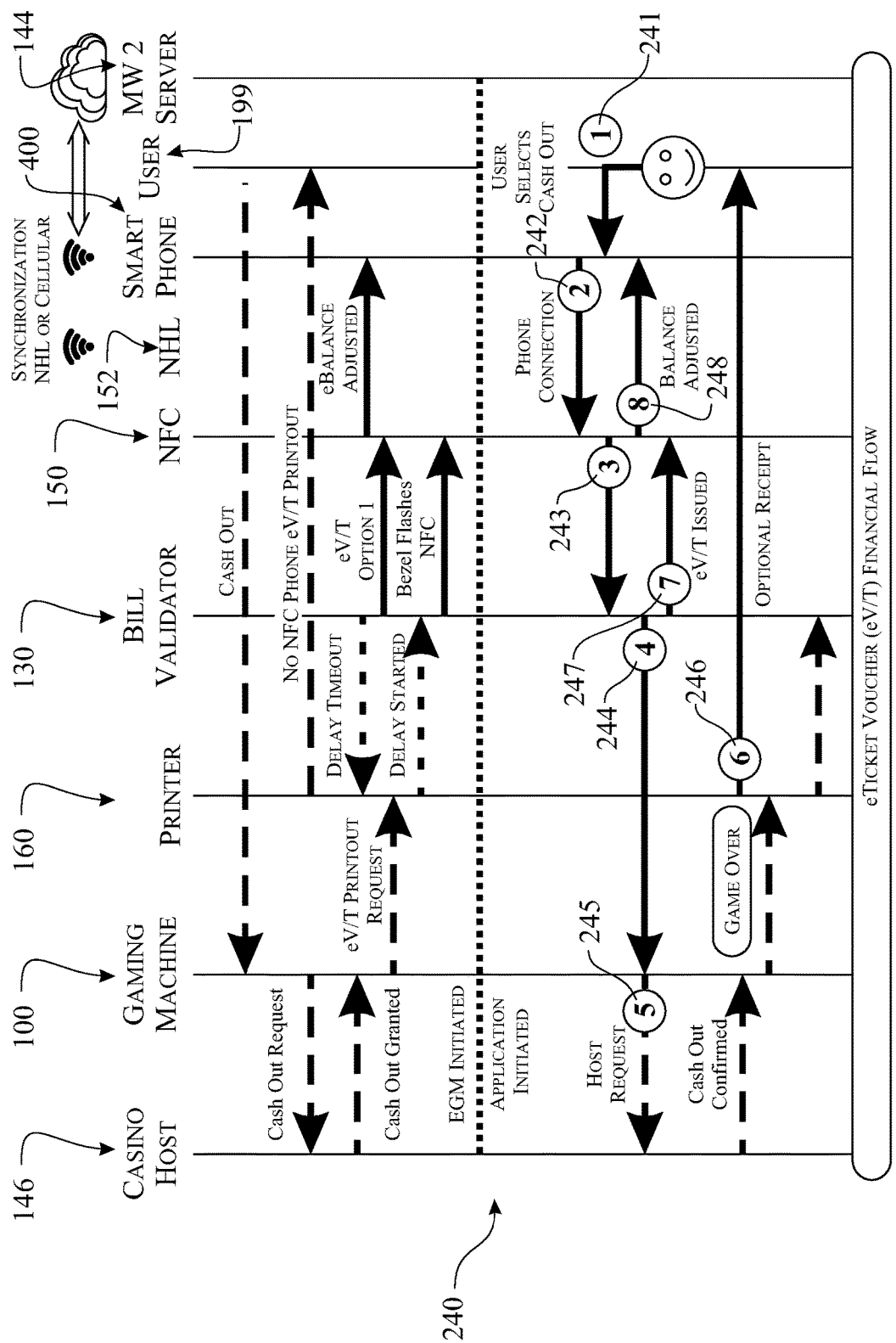
FIG. 5 presents a schematic diagram detailing an exemplary electronic voucher ticket (eV/T) cash out process, terminating play at the electronic gaming machine.

The play can conclude by either a depletion of credits pending in the automated machine 100 or at a request submitted by the user 199. An exemplary electronic voucher ticket (eV/T) cash out process flow diagram 240 is presented in FIG. 5. The financial process flow diagram 240 presents a general interaction between contributing elements for cashing out after play on the automated machine 100. The various contributing elements include those previously described in FIG. 3, wherein the leap forward gaming 158 and the smartphone 400 can be used interchangeably. The process initializes with the user 199 submitting a request for issuance of credits onto the electronic voucher ticket 410 (step 241). The request is entered using an application on the smartphone 400 via a communication with the near field communications device 150 (step 242). The near field communications device 150 forwards the information via a digital communication link with the bill validator 130 (step 243). The bill validator 130 forwards the information directly or indirectly to the gaming facility host server 446 (steps 244 and 245). The gaming facility host server 446, in conjunction with the automated machine 100, tallies any tendered balance, concludes play of the game, and issues a digital electronic voucher ticket 410 (step 246). The new electronic voucher ticket 410 is forwarded to the near field communications device 150 (step 247). The new electronic voucher ticket 410 is transferred to the smartphone 400 using near field communication protocol (step 248).

Automated machines 100 can utilize voucher tickets 310, 410 in conjunction with a financial account server 512 associated with a casino 510 to control and communicate a financial value while a player is within a casino 510 as illustrated in an exemplary schematic diagram presented in FIG. 3. The voucher ticket can be provided as a paper voucher ticket 310 or an electronic voucher ticket 410.

Each voucher ticket 310, 410 would include a computer legible value reference 12, wherein the computer legible value reference 12 can be in any computer readable format, including a barcode, a Quick Read or QR code (as illustrated), and the like. The computer readable value reference 12 is preferably encoded using a protocol that is specific to the respective casino 510. For ease of use, it is desirable that each voucher ticket 310, 410 includes a human legible value reference 10. The human legible value reference 10 would include a human legible financial value of the voucher ticket 310, 410. Each voucher ticket 310, 410 can include additional information suitable for the respective application. The additional information can include a casino identifier 320, a voucher ticket issue date 326 and a voucher ticket expiration date 328. The voucher ticket expiration date 328 is set by a predetermined time period from the voucher ticket issue date 326. The voucher ticket issue date 326 and/or the voucher ticket expiration date 328 is preferably recorded on a voucher ticket database server 512, 522, 532. The paper voucher ticket 310 includes printing applied upon one or both surfaces of a paper voucher ticket substrate 312. The paper voucher ticket 310 can additionally include a master ticket identifier 322 and/or a local ticket identifier 324 for security purposes.

The paper voucher ticket 310 can include a master ticket identifier 322 and/or a local ticket identifier 324, wherein the master ticket identifier 322 is essentially a unique serial code (numeric, alphabetic, or alpha-numeric) utilized in identifying the validity of the paper voucher ticket 310 and the local ticket identifier 324 is a secondary validation code. The local ticket identifier 324 is another identification reference used in conjunction with the paper voucher ticket 310 and assigned to one voucher ticket master identification reference. More specifically, the master and local identification reference has a one-to-one association. The local ticket identifier 324 is assigned by the electronic money management system 512, and used in conjunction with the equipment described herein, is not used at the casino voucher ticket server 512. Because the master identification reference can be redeemable for cash, it is desired to conceal the master identification reference on a smartphone display 404 of a PC or smartphone 400. A local identification reference 324 is employed for the user of the system. The master identification reference 324 is only used when certain messages about the voucher ticket 310, 410 should be sent or received between the voucher ticket server 512 in the casino 510 and the system.

The electronic voucher ticket 410 can be communicated to the smartphone 400 by a wired or wireless communication interface. For reference, the smartphone 400 can comprise common elements associated with a smartphone, a tablet, or any other suitable portable computing device. These elements can include a smartphone display 404 carried by a smartphone housing 402, wherein the smartphone display 404 can be a standard display or more desirably, a touch screen display enabling tactile inputs by the user. The smartphone display 404 presents images from a digital image file. The digital image file would include information to store and display the electronic voucher ticket 410. The elements of the smartphone 400 additionally include a microphone 406 and a speaker 408 for voice communication. At least one Smartphone mechanical user control interface 405 is included providing alternative tactile inputs respective to the smartphone display 404. Advanced portable computing devices include a camera 409 enabling acquisition and storage of digital images. The electronic voucher ticket 410 includes a majority of the same features as the paper voucher ticket 310, wherein like elements of the electronic voucher ticket 410 and the paper voucher ticket 310 are numbered the same except preceded by the numeral '4'. The paper voucher ticket 310 is generated by a printing process. The electronic voucher ticket 410 is communicated to the smartphone 400 by any suitable, preferably secure digital data communication protocol. Master information respective to the value and status of the voucher tickets 310, 410 are stored on the respective casino voucher ticket database server 512.

Figure 7:
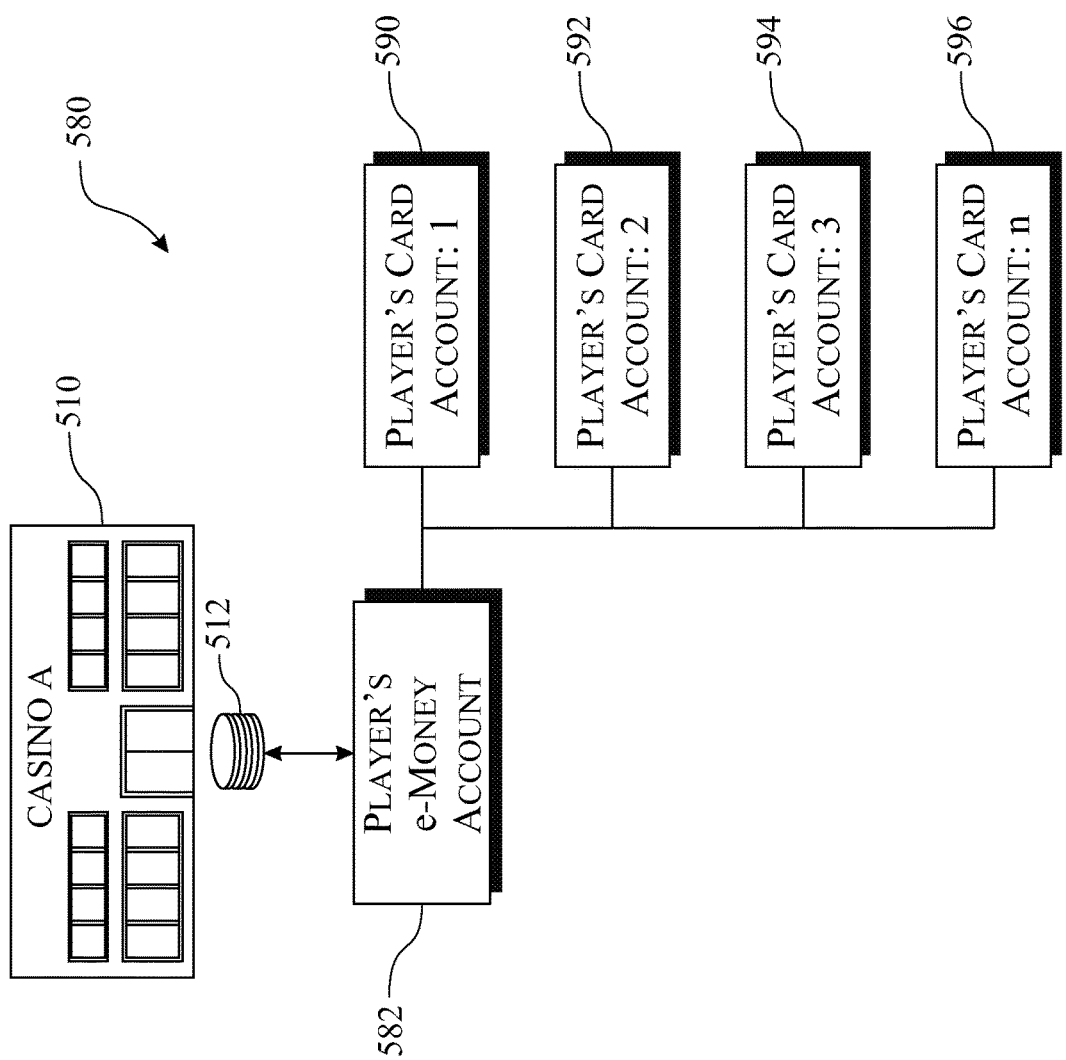
FIG. 7 presents a schematic diagram illustrating an exemplary arrangement of an electronic financial server.

An exemplary e-money or voucher ticket management system 580 is presented in a schematic diagram illustrated in FIG. 7. The casino voucher ticket database server 512 can be organized each player's e-money account 582. Each player's e-money account 582 can be shared across or distributed into each of a plurality of player's cards 590, 592, 594, 596.

Figure 8:
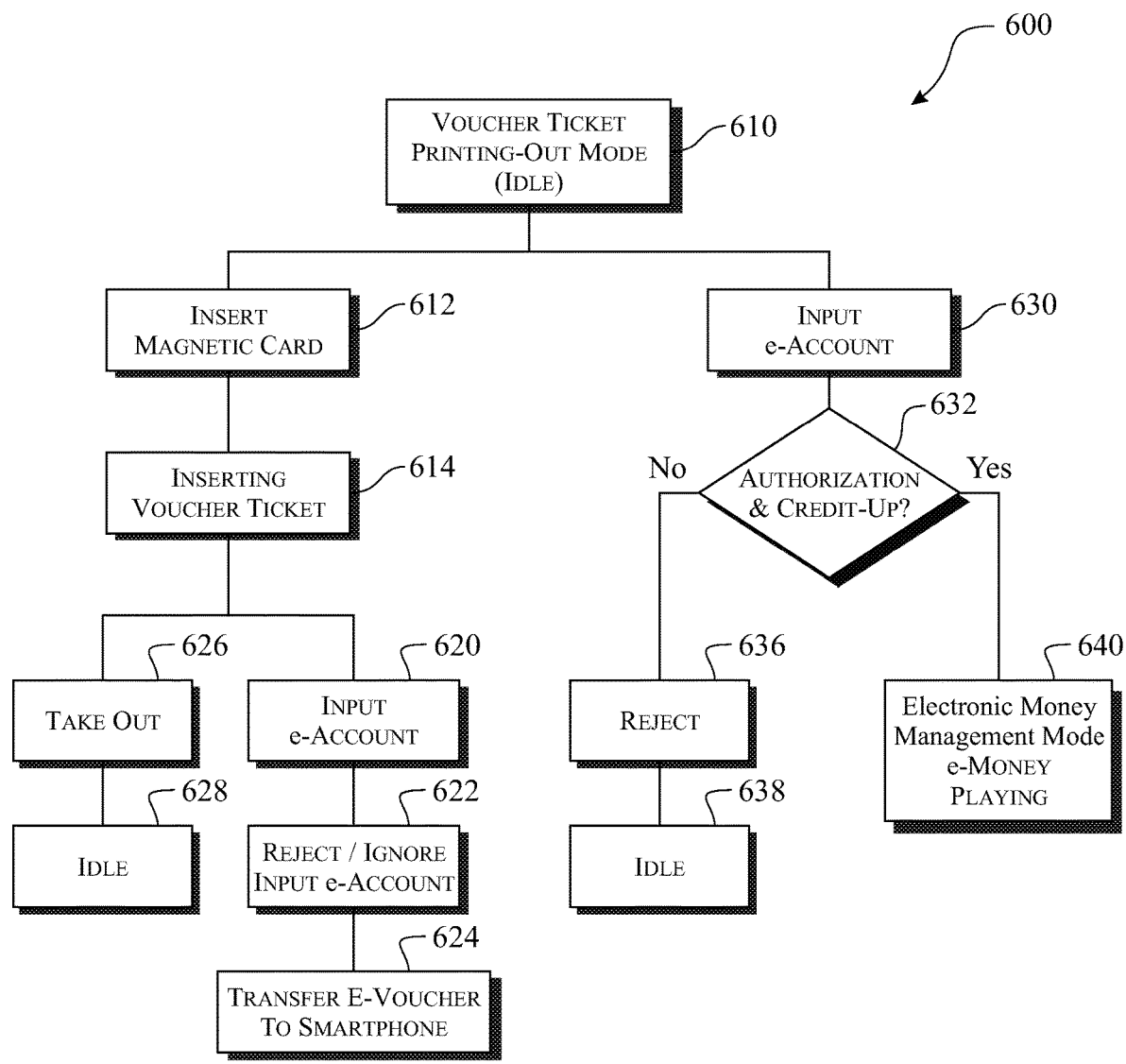
FIG. 8 presents a first portion of a flow diagram illustrating an exemplary electronic financial process flow, more specifically an initiation portion of the process.
Figure 9:
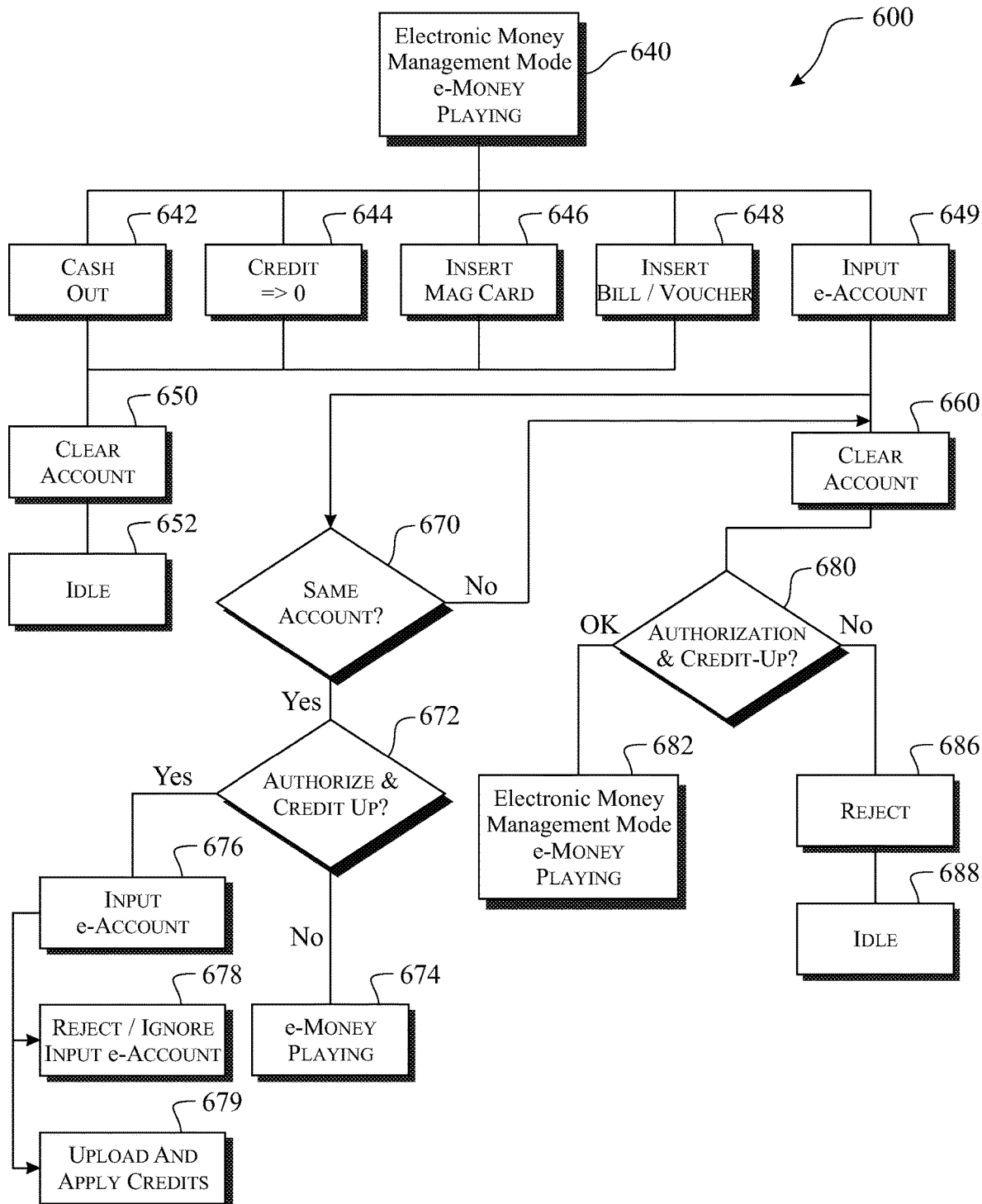
FIG. 9 presents a second portion of a flow diagram illustrating an exemplary electronic financial process flow, more specifically an electronic money management mode thereof.

An exemplary electronic financial process flow 600 is presented in two portions, a first portion being presented in FIG. 8, with the process continuing in a second portion being presented in FIG. 9. The process initiates with an issued voucher ticket 310, 410 (step 610). The player initiates use of the gaming machine 100 by selecting the desired mode of operation. The player can initiate an option utilizing the paper voucher ticket 310 or the electronic voucher ticket 410. Initially, the player would identify their player account by informing the gaming machine 100 of such. This can be accomplished by inserting a magnetic card into a player's card slot within the gaming machine 100 (step 612). The gaming machine 100 would convey information obtained from the player's card to the respective casino voucher ticket database server 512 to establish the desired association. The player would prior to, subsequently, or simultaneously insert the paper voucher ticket 310 into the gaming machine 100 (Step 614). The gaming machine 100 would determine the financial or token value of the paper voucher ticket 310 and upload the financial or token value to the gaming machine 100 for play. The player would initiate and continue play on the gaming machine 100 until a desired point of conclusion. At the time of conclusion, the player would request a voucher ticket for any remaining credit or financial value of the game. The player can enter the desired form factor of the voucher from the gaming machine 100. The gaming machine 100 would respond in accordance with the player's instructions. A first option would be to print and dispense a new paper voucher ticket 310 (Step 626). Once the new paper voucher ticket 310 is printed, the system would return to an idle state (step 628). A second option would be to transfer the credit or financial value pending at the point of termination of the game to an e-account (Step 620). The system compares e-account information entered by the player (Step 620) with e-account information stored on the casino voucher ticket database server 512. The system determines if the entered information is consistent with the information stored on the casino voucher ticket database server 512 (Step 622). In a condition where the entered e-account information is consistent with the information stored on the casino voucher ticket database server 512, the system transfers a new electronic voucher ticket 410 to the smartphone 400 (Step 624). In a condition where the entered information is inconsistent with the information stored on the casino voucher ticket database server 512, the system notifies the player with the inconsistency and rejects a request for an e-account transfer.

Alternatively, the player can elect to utilize funds from an e-account. The user enters the e-account information into the gaming machine 100 (Step 630). The system processes the entered information to determine if the entered information is consistent with the information stored on the casino voucher ticket database server 512 (decision Step 632). In a condition where the entered information is consistent with the information stored on the casino voucher ticket database server 512, the system toggles into an electronic money management mode (Step 640). In a condition where the entered information is inconsistent with the information stored on the casino voucher ticket database server 512, the system rejects the request for entry of a financial value (Step 636). The system can direct the player to re-enter the e-account information, request that the player utilize a different source for application of the game fees or simply terminate the process and return to an idle state (Step 638).

Details of the electronic money management mode are presented in FIG. 9. The electronic money management mode (Step 640) presents a series of options. The options are based upon the status of play, the current pending credit or financial value retained within the gaming machine 100, and the like. In a condition where the current pending credit or financial value retained within the gaming machine 100 is greater than zero, the player can continue playing (Step 644) or request to cash out (Step 642). The cash out can be accomplished by printing a paper voucher ticket 310 or conveying an electronic voucher ticket 410 to a smartphone 400. The player can insert a magnetic card into the game machine 100 to identify themselves with the game machine 100 as well as the casino voucher ticket database server 512 or other casino financial database server (Step 646). The player can opt to insert a bill, a paper voucher ticket 310, or the like into the game machine 100 (Step 648). The game machine 100 would apply a credit equaling the value of the entered bill, the entered paper voucher ticket 310, or the like to the total pending credit or financial value stored therein. Upon completion of play, the game machine would disburse a voucher 310, 410 to the player in accordance with the mode selected by the player. The game machine 100 would subsequently clear the account (Step 650) and return to an idle stage (Step 652).

When using an e-account, the player would enter the e-account information (Step 649). The method of entry can vary based upon the options integrated into the game machine 100. The process determines if the e-account information entered into the game machine 100 is the same as the e-account that has been pending. If the entered e-account information is the same as the e-account currently pending in the game machine 100 (Step 670), the process continues by requesting entry of an authorization code and application of funds to the gaming machine 100. In a condition where the player desired to increase the pending credit value (Step 672), the player enters the associated e-account and authorization information (Step 676). The entered information is validated against information stored within the e-money or voucher ticket management system 580. In a condition where the entered information is inconsistent with the information stored on the e-money or voucher ticket management system 580, the system notifies the player with the inconsistency and rejects a request for an e-account transfer (Step 678). In a condition where the entered e-account information is consistent with the information stored on the e-money or voucher ticket management system 580, the system uploads and applies the financial value to the pending credits (Step 679). Wherein the player elects to continue playing with the pending credit, the system continues play using e-money (Step 674).

In a condition where the entered e-account information differs from the e-account information pending in the gaming machine 100, the gaming machine 100 clears the pending account (Step 660) and proceeds requesting the player enter authorization and a financial transaction to apply credits accordingly (Step 680). The player would commonly proceed by entering the associated e-account and authorization information and proceeding accordingly in an electronic management mode (Step 682).

In a condition where the player rejects this request (Step 686), the gaming machine returns to an idle condition (Step 688).

Figure 10:
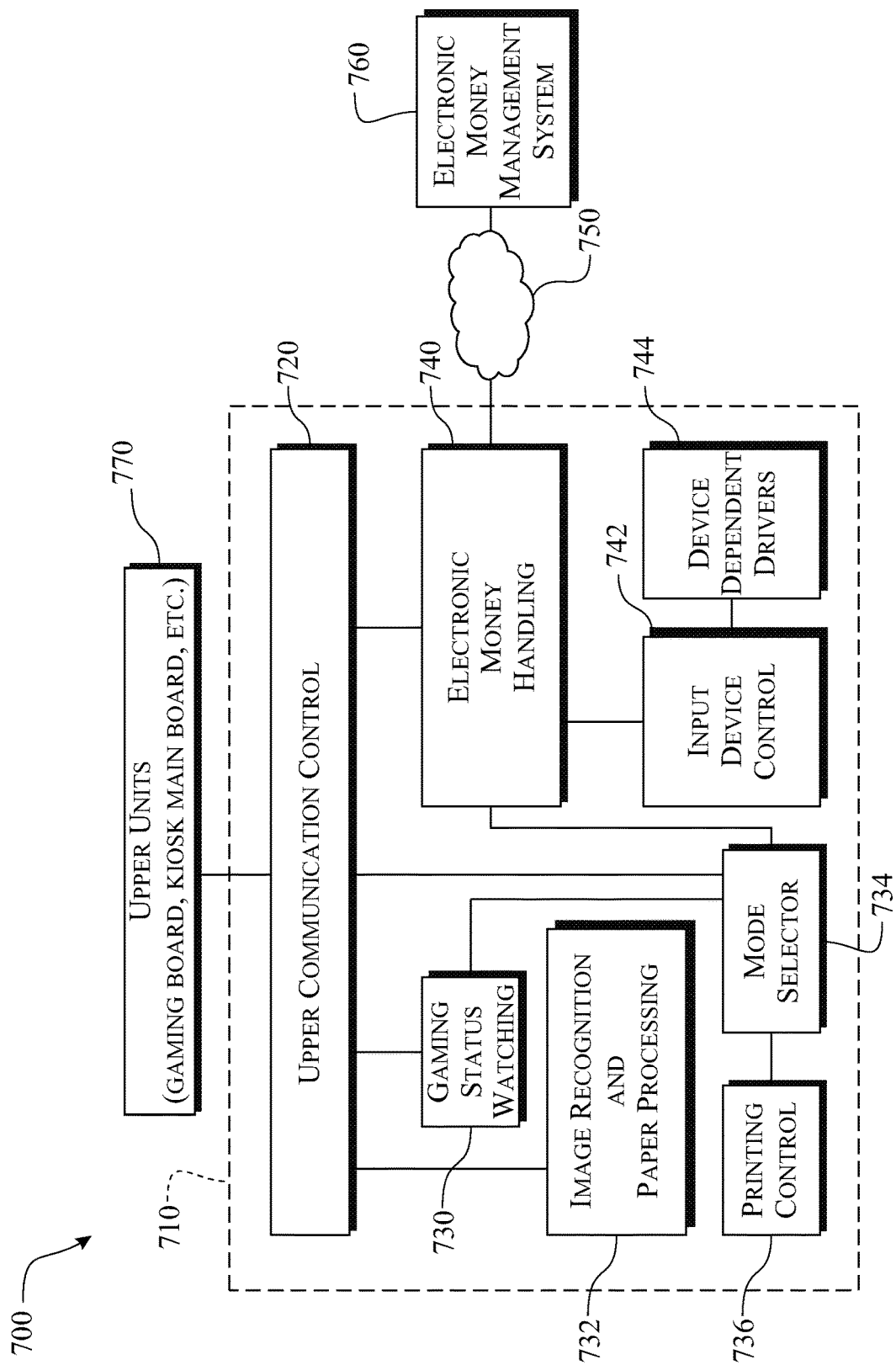
FIG. 10 presents a schematic diagram illustrating an exemplary e-money processing system integrated into a bill validator system.

An exemplary bill validator system 700 is illustrated in a schematic diagram format presented in FIG. 10. The bill validator system 700 includes an e-money integrated bill validator structure 710 provided in signal communication with an electronic money management system 760 and a gaming machine operational system 770. The signal communication can be provided using a wired interface or a wireless communication interface, such as a network communications 750. The e-money integrated bill validator structure 710 and gaming machine operational system 770 are preferably integrated into the gaming machine 100, while the electronic money management system 760 can be located at a distance from the gaming machine 100. The gaming machine operational system 770 is representative and can include an electronic gaming main board, a kiosk main board, and the like. The electronic money management system 760 is preferably a centralized system, interfacing with multiple gaming machines 100 using the network communications 750 for communication therebetween.

The e-money integrated bill validator structure 710 includes the necessary components for processing financial transactions, and directing operation of the gaming machine operational system 770. The e-money integrated bill validator structure 710 includes an electronic money handling 740 for receiving, scanning, and stowing bills or other acceptable currency. The electronic money handling 740 is operated by an input control device 742 in conjunction with the respective device dependent drivers 744. The electronic money handling 740 is integrated in signal communication with a mode selector 734 as well as an upper communication control 720. The mode selector enables selective operation of the gaming device 100. This includes operation of the gaming machine 100, the preferred method for accomplishing the financial transactions (using a paper transaction process, using an e-money transaction process, and the like), and any other operational option integrated into the gaming machine 100. The mode selector 734 is provided in signal communication with a printing process control 736, a gaming status watching 730, and the upper communication control 720. The mode selector 734 can be used to establish a condition where the player desires to use either e-money or paper voucher tickets 310. Wherein the player elects to use paper voucher tickets 310, the mode selector 734 activates the printing process control 736. The mode selector 734 can optionally provide a second benefit, wherein the mode selector 734 can be used to manage the gaming status watching 730. The overall management of the e-money integrated bill validator structure 710 is provided by the upper communication control 720. The upper communication control 720 can be integrated into the e-money integrated bill validator structure 710 in a manner establishing signal communication between the upper communication control 720 and one or more of the gaming status watching 730, the image processing and paper processing 732, the mode selector 734, and/or the electronic money handling 740. The upper communication control 720 provides an operational interface between the balance of the components within the e-money integrated bill validator structure 710 and the gaming machine operational system 770. The upper communication control 720 handles the communication process between the e-money integrated bill validator structure 710 and the gaming machine operational system 770 using any suitable standard protocol, including ID003, ID024, ID028, ID0G8, DES encryption, Universal Serial Bus (USB), ICT, SMIB, NISR, USBTAO-V, Pulse or 5V enabled, and the like. The money integrated bill validator structure 710 can include any suitable interface, including pulse, serial (including Universal Serial Bus or USB), parallel, RS232, MDB, CC-Talk, CCNET, GBA, and the like.

The electronic money handling 740 manages the transaction of the electronic money and the voucher ticket information, and handles the communication process with the electronic money management system 760. The electronic money handling 740 manages, holds, releases, and authenticates each respective electronic money account. The electronic money account is specifically referencing a financial account, and more specifically an electronic money account. The electronic money management system 760 would preferably include the arrangement presented in FIG. 4.

Figure 11:
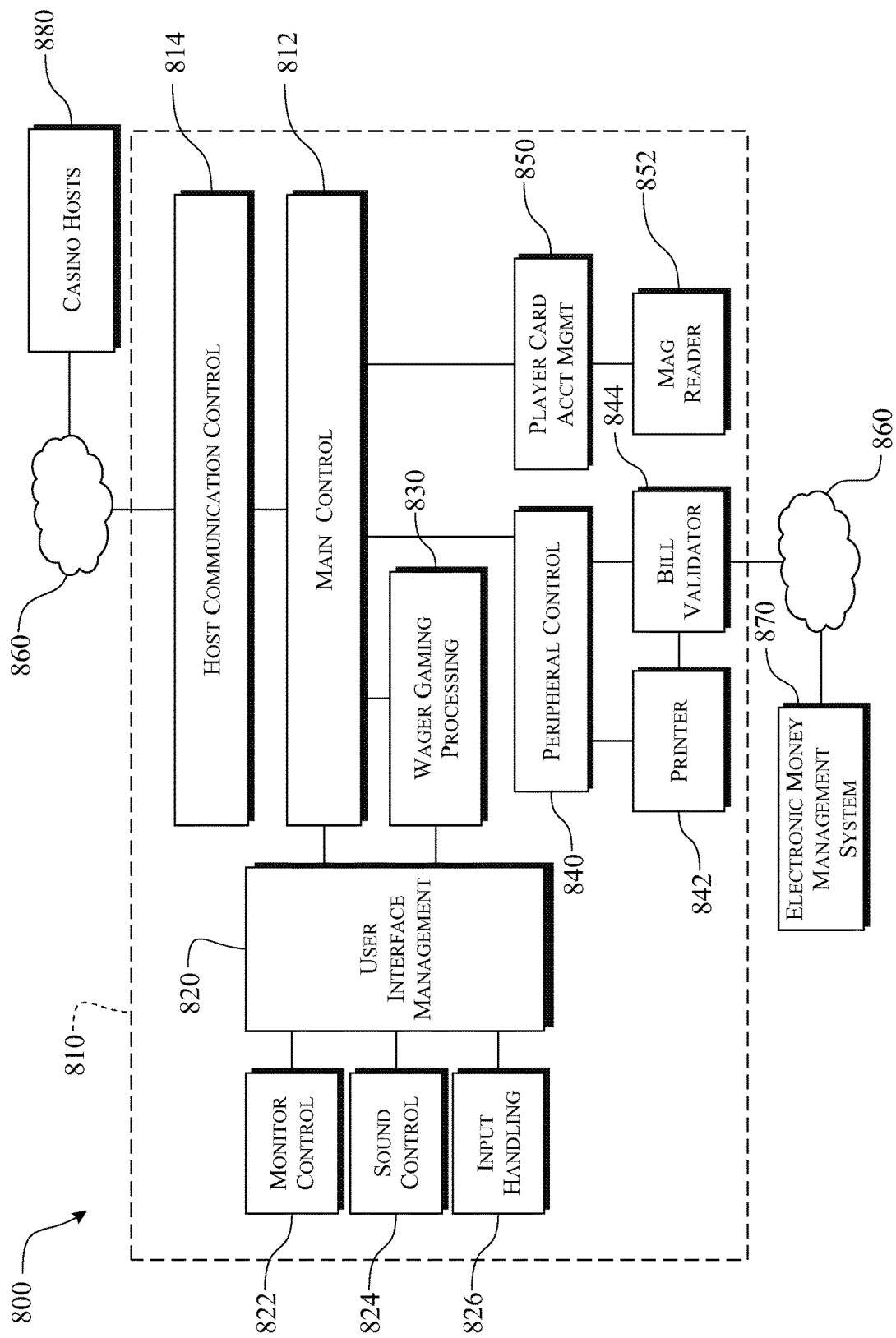
FIG. 11 presents a schematic diagram illustrating an exemplary e-money processing system integrated into a gaming machine.

An exemplary gaming machine network 800 is illustrated in a schematic diagram format presented in FIG. 11. The gaming machine network 800 includes a gaming machine configuration 810 provided in signal communication with an electronic money management system 870 and a casino host 880 by way of a network communications 860. The exemplary gaming machine configuration 810 includes a variety of components to provide a gaming machine system having an e-money processing function integrated therein. The e-money integrated bill validator structure 710 utilizes a main controller 812 for governing operation of the gaming machine configuration 810. The gaming machine main controller 812 is provided in signal communication with a host communication controller 814, a user interface management 820, a wager gaming processor 830, a peripheral controller 840, and a player card account management 850. The user interface management 820 provides an interface between the gaming machine main controller 812 and any user interface device, including a monitor controller 822, which provides a visual output and an optional touch screen input function; an audio controller 824, which provides an audible output and an optional audible recording or other input function; and an input management 826, which provides other user entry functions, such as a keyboard, a cursor pointing device, and the like. The wager gaming processor 830 can be integrated into the gaming machine configuration 810, wherein the wager gaming processor 830 is provided in signal communication with both the gaming machine main controller 812 and the user interface management 820. The peripheral controller 840 provides an interface between the gaming machine main controller 812 and peripheral devices, including a printer 842, a bill validator 844, a camera (not shown), and the like. The player card account management 850 provides management functions respective to the player's card account. The player card account management 850 obtains the player's card account information through a magnetic card reader 852.

The network communications 860 is preferably a secured network utilizing an encrypted signal communication protocol. Signal communication between the gaming machine configuration 810 and the electronic money management system 870 is provided through the network communications 860. The electronic money management system 870 provides functionality similar to the electronic money management system 760 previously described. Signal communication between the gaming machine configuration 810 and the casino hosts 880 is also provided through the network communications 860.

Figure 12:
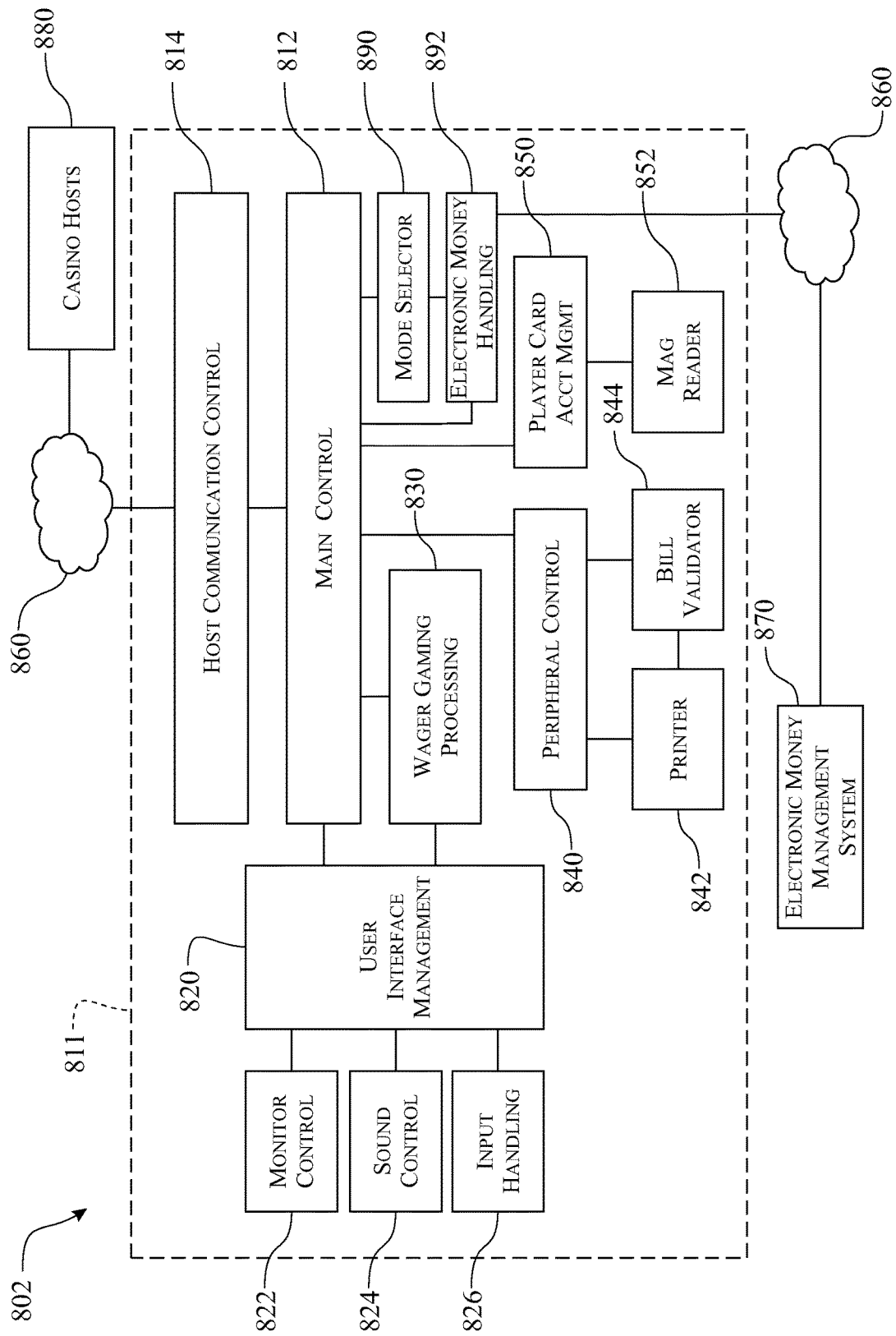
FIG. 12 presents a schematic diagram illustrating an exemplary externally located e-money processing system in communication with a gaming machine.

A modified exemplary modified gaming machine network 801 is illustrated in a schematic diagram format presented in FIG. 12, wherein the enhancement reconfigures the integration of the e-money processor. The gaming machine network 800 integrates the e-money processing within the bill validator 844. The modified gaming machine configuration 811 is configured for processing the e-money transaction externally from the bill validator 844. The modified gaming machine network 801 includes a modified gaming machine configuration 811. The modified gaming machine configuration 811 is a modified version of the gaming machine configuration 810, wherein the modified gaming machine configuration 811 integrates a mode selector 890. The mode selector 890 toggles between a standard bill and voucher ticket mode and an electronic financial mode. In the electronic financial mode, the mode selector 890 activates an electronic money handling system 892. The activated electronic money handling system 892 provides communication between the gaming machine main controller 812 and the electronic money management system 870.

Figure 13:
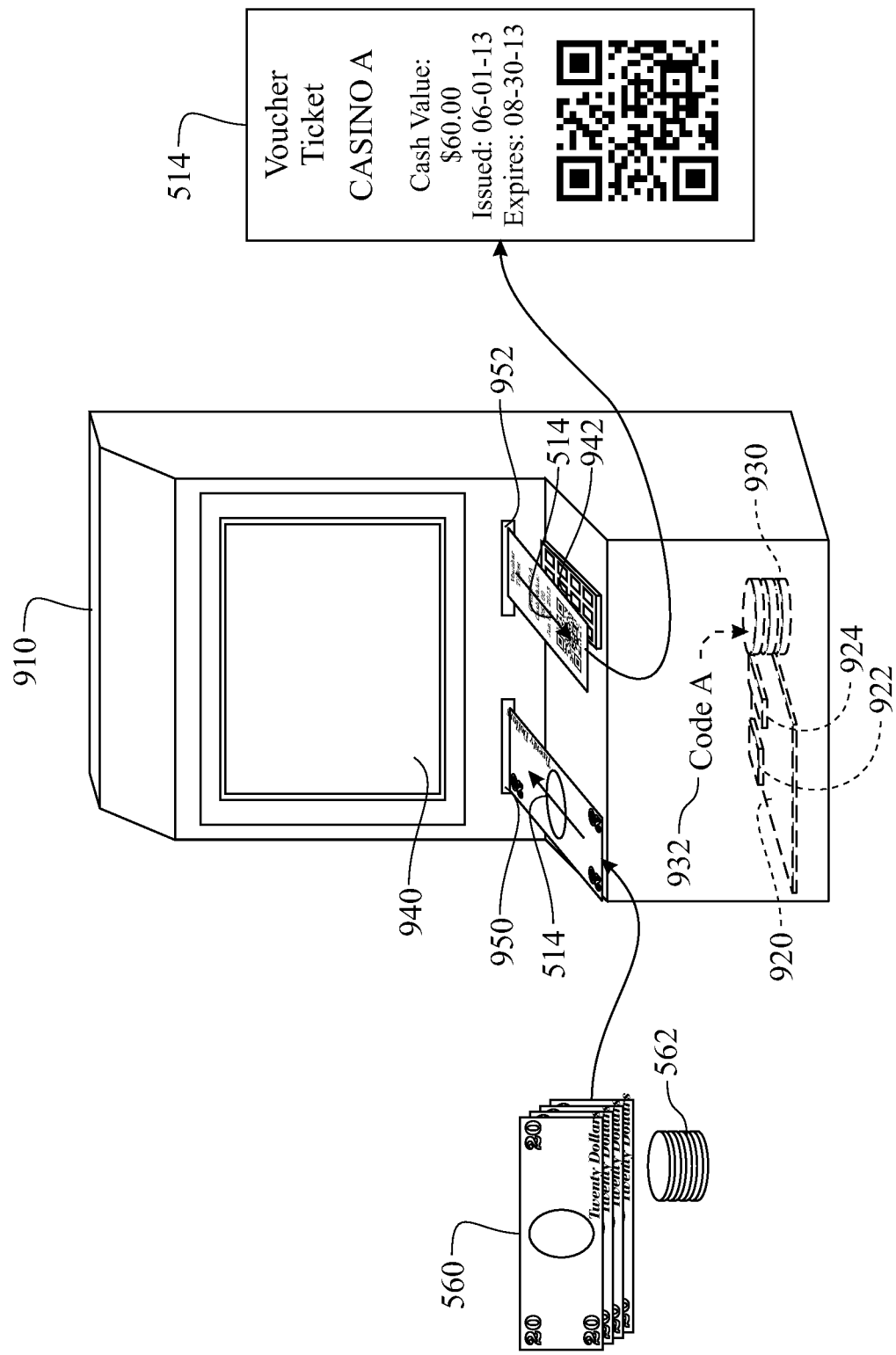
FIG. 13 presents a schematic diagram illustrating an exemplary automated printed voucher ticket currency exchange machine.

The voucher ticket system can utilize an automated system for exchanging currency 560 and coins 562, such as the exemplary voucher ticket automated processing unit 910 illustrated in FIG. 13. The voucher ticket automated processing unit 910 includes functional components for processing the currency 560 and coins 562 and dispensing a casino A voucher ticket 514 of an equivalent value. A processing circuit assembly 920 includes a central processing unit 922, a digital memory device 924, and other electrical components to form a circuit. The circuit enables functional operation of the voucher ticket automated processing unit 910. It is a general practice for each gaming facility to utilize their own custom encryption for generation of the computer readable reference (similar to the computer readable value reference 12). Small volumes of digital data can be stored within the digital memory device 924. The digital memory device 924 can be solid-state memory. Larger volumes of digital data are preferably stored in a general memory storage device 930. The general memory storage device 930 can utilize one or more disc drives, tape drives, or larger solid-state memory banks. The system would include an encoding protocol 932 or the encryption coding specific to the gaming facility. The encoding protocol 932 can be stored within the digital memory device 924, within the general memory storage device 930, or embedded within other portions of the circuit. A display monitor 940 is integrated into the voucher ticket automated processing unit 910 and provided in signal communication with the processing circuit assembly 920. The display monitor 940 provides a visual display to inform the user of any necessary steps required for the transaction as well as the status of the exchange. The display monitor 940 can be used for other options, such as marketing, and the like when the voucher ticket automated processing unit 910 is sitting idle. The display monitor 940 can be fabricated to include a touch screen function, wherein the touch screen function enables user input through a graphical user interface (GUI).

A user input device 942 is integrated into the voucher ticket automated processing unit 910 and provided in signal communication with the processing circuit assembly 920. The user input device 942 enables manual entry of data, instructions, and the like.

A bill validator and input slot 950 enables insertion of the currency 560 and coins 562 into the voucher ticket automated processing unit 910. The bill validator and input slot 950 can include a bill validator, a coin operator, and the like for ingesting, valuating, and storing the currency 560 and coins 562. The bill validator and the coin operator are in signal communication with the processing circuit assembly 920. The value of the inserted currency 560 and coins 562 is determined by the bill validator, the processing circuit assembly 920, or any other integrated component designated for the specific function. After the quantity of currency 560 and coins 562 is deposited within the bill validator and input slot 950, the voucher ticket automated processing unit 910 determines the total financial face value of the quantity of deposited currency 560 and coins 562. Upon instruction, a printed and discharge slot 952 would print and dispense the casino A voucher ticket 514, wherein the casino A voucher ticket 514 would have a value respective to the value of the inserted currency 560 and coins 562.

Gaming facilities 510, 520, 530 can be located independently or in clusters. Each gaming facility 510, 520, 530 provides voucher tickets 514, 524, 534 that are encrypted in accordance with the gaming facilities specific encryption coding. This scenario dictates that each voucher ticket 514, 524, 534 be used and redeemed at the respective gaming facility. Should the player desire to go to a different gaming facility 510, 520, 530, the player would have to cash out their voucher ticket(s) 514, 524, 534 at the first gaming facility, then convert the funds to a voucher ticket for another gaming facility. The implementation of a voucher ticket exchange process would reduce the two-step process to a one step process, thus giving the player more time for gaming. Variations of exchange processes are presented in FIGS. 14 through 17.

Figure 14:
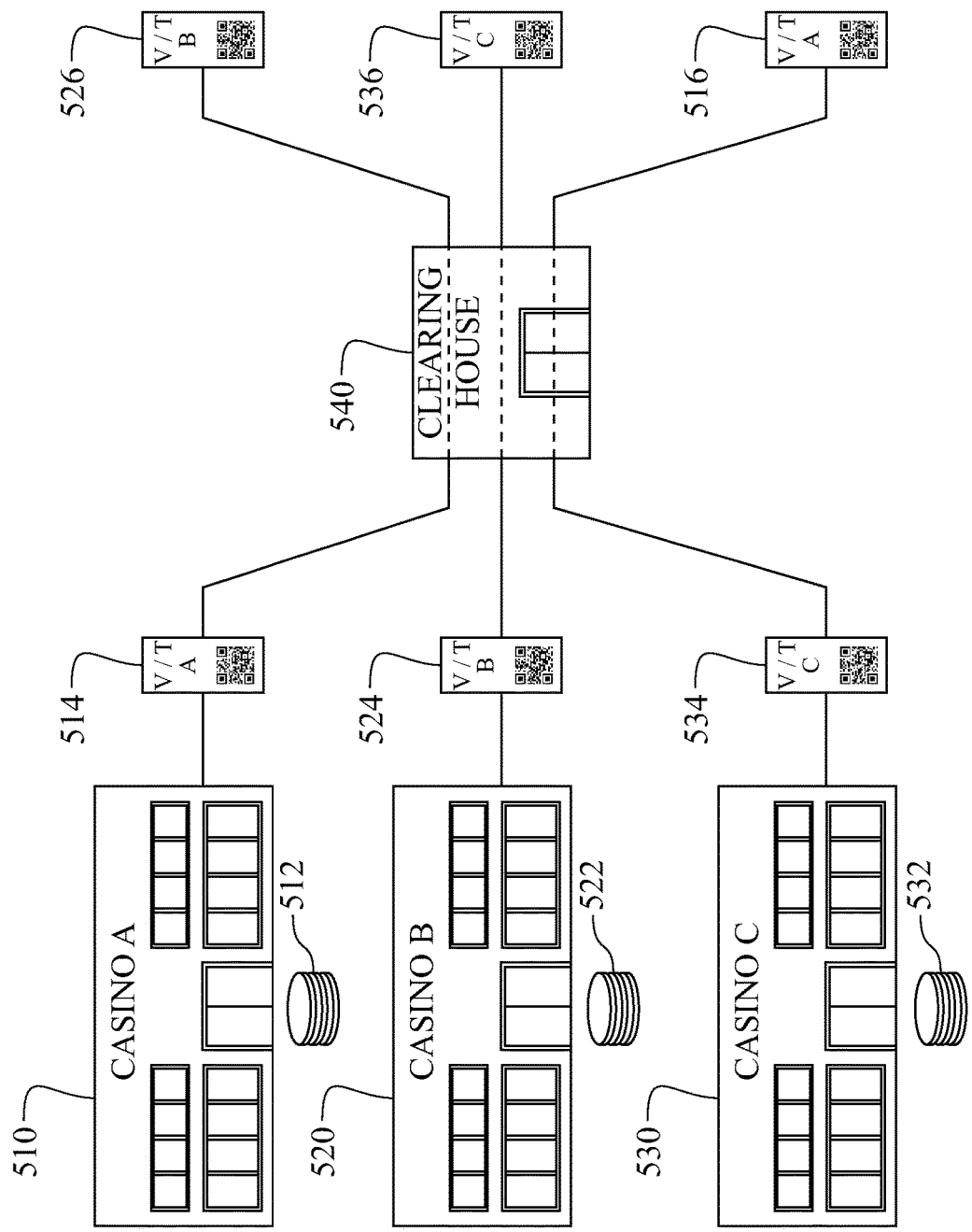
FIG. 14 presents a schematic diagram illustrating an exemplary printed voucher ticket clearing house exchange system.

A generic conceptual schematic diagram of a voucher ticket exchange process is presented in FIG. 14. The exemplary schematic diagram utilizes three gaming facilities, a casino A 510, a casino B 520, and a casino C 530. Each gaming facility includes their own respective voucher ticket database server 512, 522, 532. Each voucher ticket database server 512, 522, 532 maintains records respective to each issued voucher ticket 514, 524, 534. The player would provide a voucher ticket clearing house 540 with the issued voucher ticket 514, 524, 534 they obtained from the gaming facility 510, 520, 530 and request one or more exchanged voucher tickets 516, 526, 536. The voucher ticket clearing house 540 would collect the issued voucher ticket 514, 524, 534 from the player and disburse the requested one or more exchanged voucher tickets 516, 526, 536. The exchanged voucher tickets 516, 526, 536 can be of a value equal to the value of the collected voucher ticket 514, 524, 534, or the voucher ticket clearing house 540 can optionally include a processing fee 544 and issue the requested one or more exchanged voucher tickets 516, 526, 536 at a value reduced by the exchange rate as suggested in FIG. 15.

Figure 15:
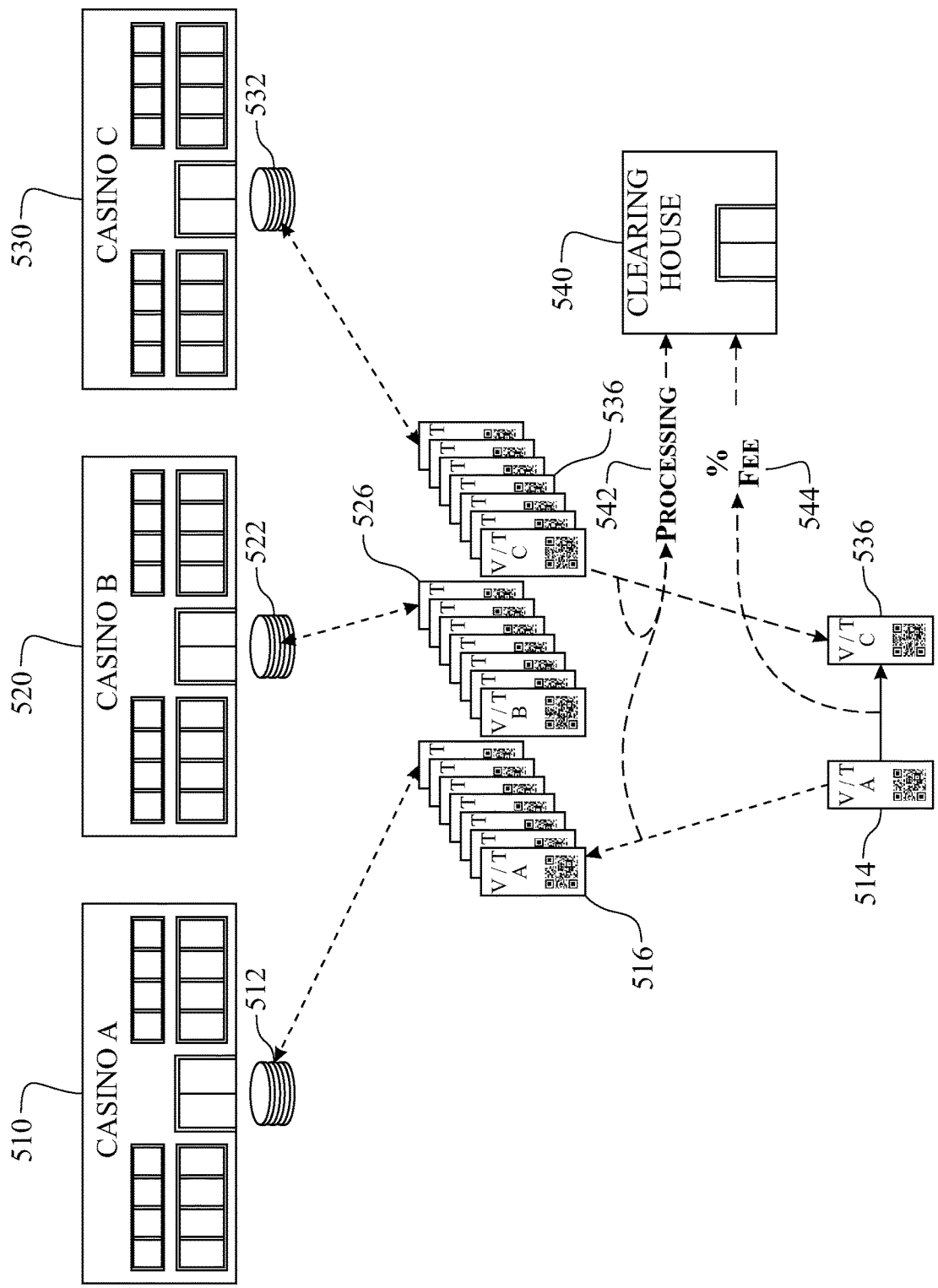
FIG. 15 presents a schematic diagram detailing an exemplary physical printed voucher ticket clearing house exchange system.

A conceptual schematic diagram of a physical voucher ticket exchange process is presented in FIG. 15. The voucher ticket clearing house 540 retains an inventory of exchange voucher tickets 516, 526, 536. The voucher ticket clearing house 540 arranges a physical voucher ticket transfer program with each gaming facility 510, 520, 530. The physical voucher ticket exchange process collects the undesired issued voucher tickets 514, 524, 534 from players and distributes voucher tickets 516, 526, 536 respective to the requested casino. The voucher tickets 516, 526, 536 would be distributed to replace the undesired issued voucher tickets 514, 524, 534, wherein the voucher tickets 516, 526, 536 would be of equal or lower value than the undesired issued voucher tickets 514, 524, 534. The voucher ticket clearing house 540 would provide the processing 542. As previously mentioned, the voucher ticket clearing house 540 can include a processing fee 544 for completing the exchange. The voucher ticket clearing house 540 would retain an inventory of voucher tickets 516, 526, 536 having predetermined valuation range for each gaming facility 510, 520, 530. Each gaming facility 510, 520, 530 retains information regarding valuation, status and the like pertaining to the player held voucher tickets 516, 526, 536 and the clearing house inventory voucher tickets 516, 526, 536 in a respective voucher ticket database server 512, 522, 532. In the example presented in FIG. 15, the player is exchanging a casino A voucher ticket 514 from casino A 510 for a casino C exchanged voucher ticket 536 issued by casino C 530. The valuation of the casino C exchanged voucher ticket 536 can be equal to or less than the valuation of the casino A voucher ticket 514.

Figure 16:
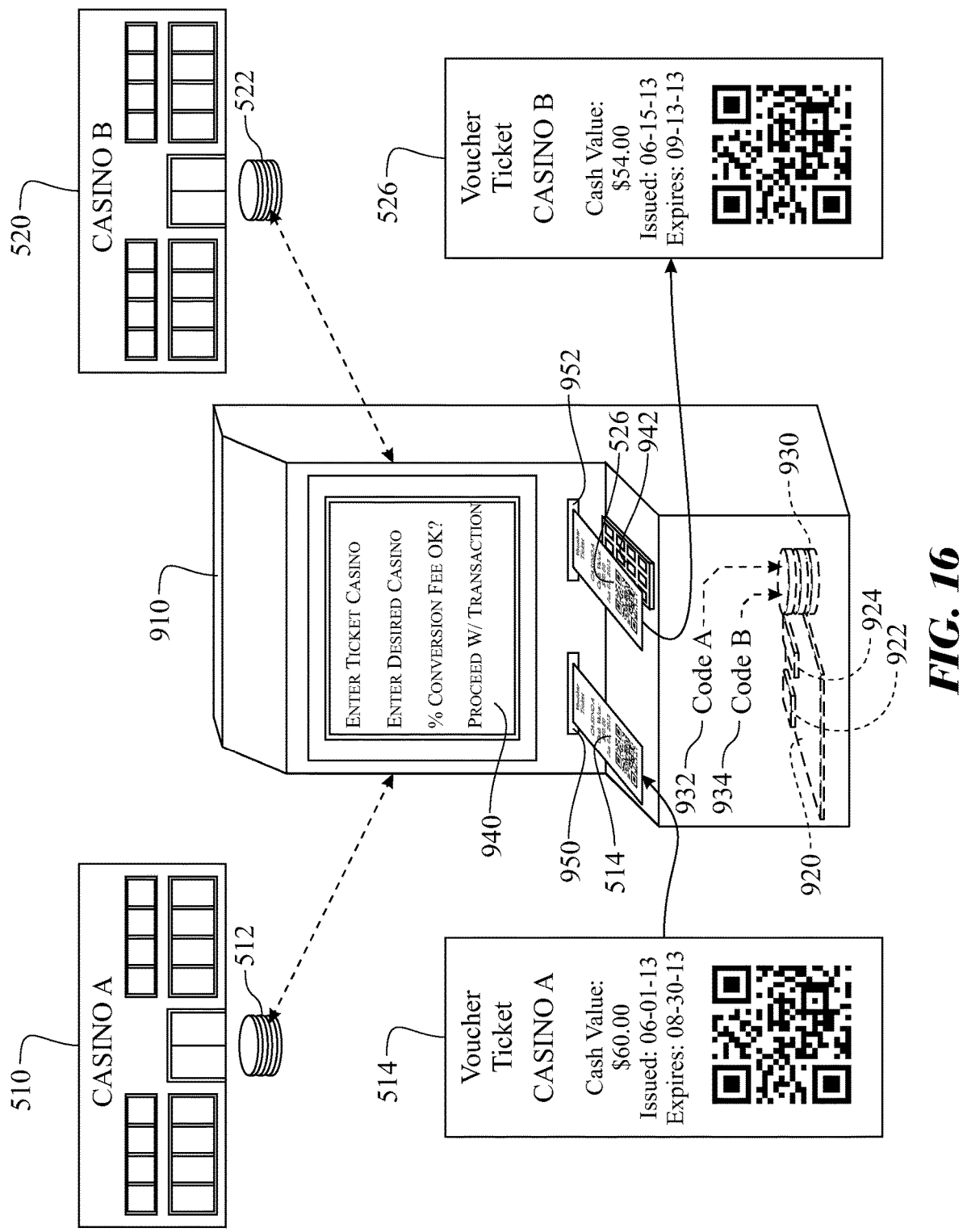
FIG. 16 presents a schematic diagram detailing an exemplary physical printed voucher ticket clearing house printed replacement system.

A second exemplary embodiment utilizes the voucher ticket automated processing unit 910 as an exchange machine, as illustrated in the schematic diagram presented in FIG. 16. The voucher ticket automated processing unit 910 can be operated by the player or an employee of the voucher ticket clearing house 540.

The player can enter the name of the gaming facility associated with the undesired issued voucher ticket(s) 514, 524, 534. The player also enters the name of the gaming facility associated with the desired replacement voucher tickets 516, 526, 536. In a condition where an exchange rate 544 is applied, the voucher ticket automated processing unit 910 would notify the player of the exchange rate 544 prior to completing the exchange process.

The undesired issued voucher ticket(s) 514, 524, 534 are inserted into the bill validator and input slot 950. The voucher ticket automated processing unit 910 would scan the computer readable value reference 12 of the inserted undesired issued voucher ticket(s) 514, 524, 534, decode the computer readable value reference 12, determine if the ticket is valid, and determine the value of the undesired issued voucher ticket(s) 514, 524, 534. In a condition where the exchange rate 544 is applied, the voucher ticket automated processing unit 910 would calculate a reduction in the total valuation of the inserted undesired issued voucher ticket(s) 514, 524, 534, and subsequently print and dispense a replacement voucher ticket 516, 526, 536 for use at the requested gaming facility 510, 520, 530. It is noted that the casino B exchanged voucher ticket 526 would be encoded in accordance with the respective second encoding protocol 934.

In the example presented in FIG. 16, the player is exchanging a casino A voucher ticket 514 from casino A 510 for a casino B exchanged voucher ticket 526 associated with a casino B 520. The exemplary valuation of the casino B exchanged voucher ticket 526 is reduced from the valuation of the casino A voucher ticket 514 by the voucher ticket exchange commission fee 544, wherein in the example, the commission in 10%, or $6.00. The process can additionally include a revised issued date. In the illustrated example, the casino A voucher ticket 514 was issued from casino A 510 on Jun. 1, 2013. The exchanged voucher ticket 526 associated with casino B 520 includes an issue date of Jun. 15, 2013.

The exchanged voucher ticket 526 can retain the issue date of the original voucher ticket 514 or the process can establish a new issue date, identified as a casino B exchanged electronic voucher ticket issue date 528. The process can address the issue date in any of a variety of solutions. In a first solution, the process can retain the original issue date and originally established expiration date. In a second solution, the process can increment the issue date and retain the originally established expiration date. In a third solution, the process can increment the issue date and increment the expiration date. The expiration date can be incremented by a pre-established period of time. The time period can be based upon the originally established issue date, the exchanged electronic voucher ticket issue date 528, or any other suitable time. The updated information resulting from the exchange process would be incorporated into the exchanged voucher ticket 526 and recorded at each respective voucher ticket database server 512, 522. The information can additionally be encoded in the encoded, computer or machine-readable image, such as a barcode, a Quick Read or QR code, and the like. It is understood that the exchanged voucher ticket 526 can have continuously resetting expiration period, an effective indefinite expiration or exclusive of an expiration date.

The above examples are directed towards paper voucher ticket 310. The same concept can be applied to the electronic voucher tickets 410, as illustrated in the exemplary schematic diagram presented in FIG. 17. The undesired issued voucher ticket(s) 514, 524, 534 are read by the voucher ticket automated processing unit 910. The reading process can be accomplished by scanning an image of a casino A electronic voucher ticket 515 displayed upon the smartphone display 404 of the smartphone 400, wireless communication between the smartphone 400 and the voucher ticket automated processing unit 910 wherein the voucher ticket is transmitted to the voucher ticket automated processing unit 910, and the like. The exchange process would include an additional step of validating the casino A electronic voucher ticket 515 with the casino A voucher ticket database server 512. The voucher ticket automated processing unit 910 would subsequently communicate with the casino B voucher ticket database server 522 to obtain or purchase a financial value for issuance of a casino B exchanged electronic voucher ticket 527. Alternatively, the voucher ticket clearing house 540 can retain an account having a value for use for issuance and credits of voucher tickets 515, 527 for each partnered gaming facility 510, 520, 530. The replacement voucher ticket 516, 526, 536 is conveyed to the smartphone 400 using a wired or wireless transmission. Alternatively, an image of the entire replacement voucher ticket 516, 526, 536 or a representative computer readable value reference 12 can be displayed upon the display monitor 940. The player would utilize the camera 409 to obtain a digital image of the displayed information and the smartphone 400 would properly interpret and convert the acquired image into an electronic replacement voucher ticket 516, 526, 536.

Figure 17:
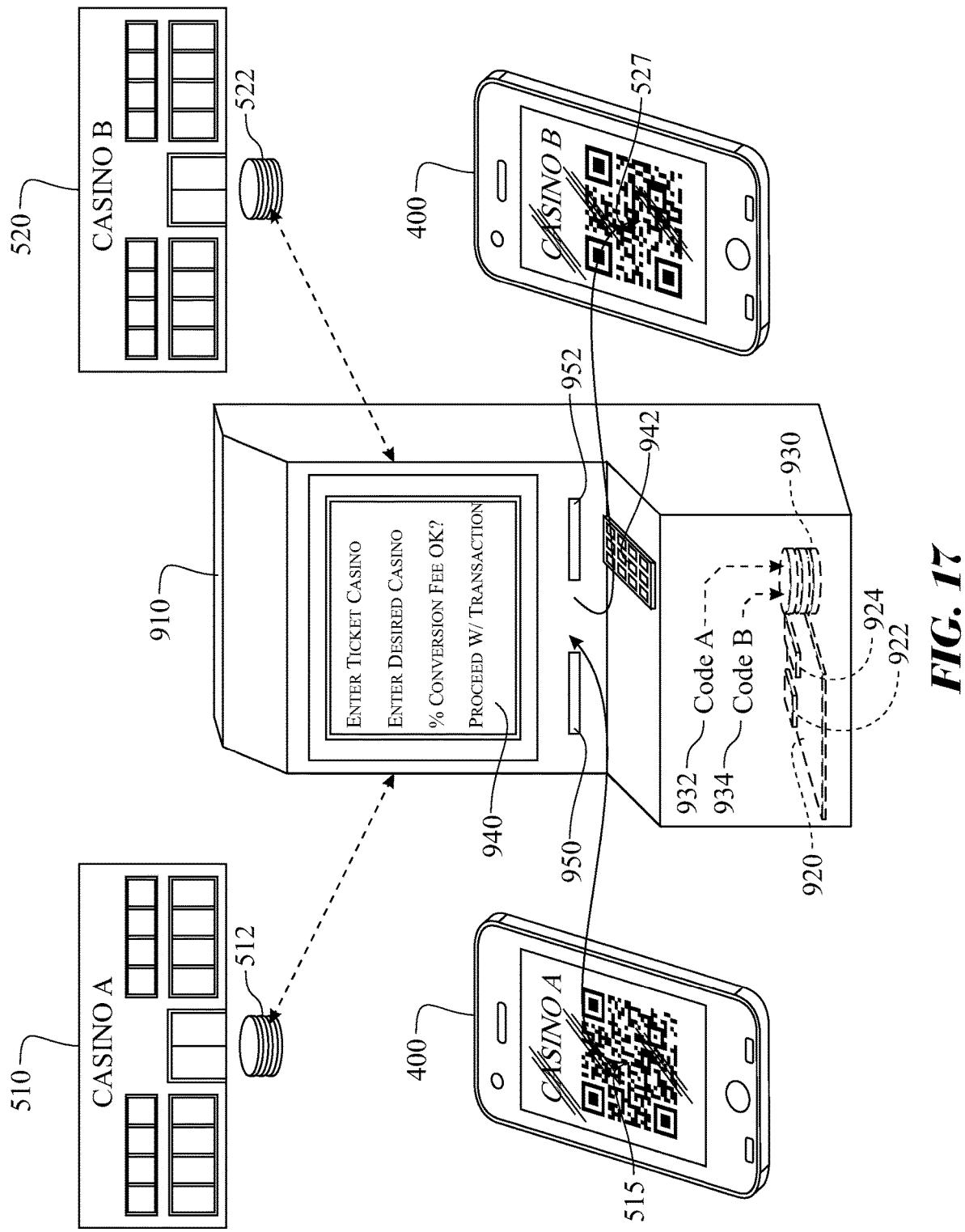
FIG. 17 presents a schematic diagram detailing an exemplary electronic voucher ticket clearing house exchange system.

In the example presented in FIG. 17, the player is exchanging a casino A electronic voucher ticket 515 from casino A 510 for a casino B exchanged electronic voucher ticket 527 associated with the casino B 520. Changes in valuation are not presented in this example.

Figure 18:
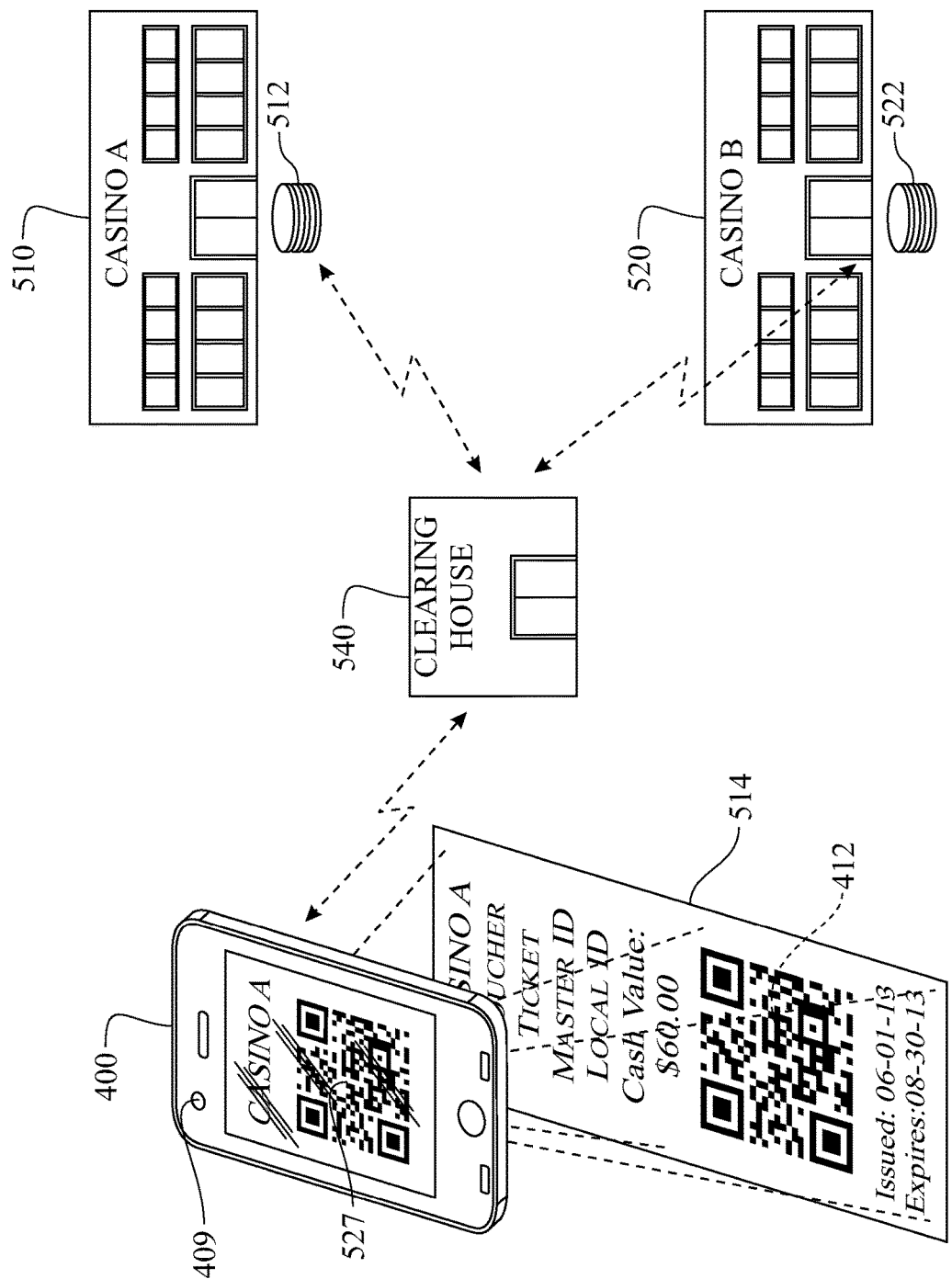
FIG. 18 presents a schematic diagram detailing an exemplary voucher ticket to electronic voucher ticket conversion process utilizing the clearing house exchange system.

The issuing casino voucher ticket 514 can be operationally converted to an exchanged electronic voucher ticket 527 through the voucher ticket clearing house 540, as illustrated in FIG. 18. The smartphone 400 would obtain a digital image of the issuing casino voucher ticket 514 using a camera 409 integrated into the smartphone 400. The smartphone 400 would communicate a digital image or other digital representation of the issuing casino voucher ticket 514 (representing a exchanged electronic voucher ticket 527) to the voucher ticket clearing house 540. The voucher ticket clearing house 540 is in encoded digital communication with the issuing casino voucher ticket database server 512 of the issuing casino 510. The voucher ticket clearing house 540 forwards the digital representation of the exchanged electronic voucher ticket 527 to the issuing casino voucher ticket database server 512 using any secured wired or wireless communication interface. Either the voucher ticket clearing house 540 or the issuing casino voucher ticket database server 512 decodes and interprets the digital representation of the exchanged electronic voucher ticket 527 into a format that is compatible with the database of the issuing casino voucher ticket database server 512. The issuing casino voucher ticket database server 512 determines the validity of the issuing casino voucher ticket 514 (based upon the information provided as the exchanged electronic voucher ticket 527), and records data respective to a conversion of the issuing casino voucher ticket 514 to the exchanged electronic voucher ticket 527. The issuing casino voucher ticket database server 512 can optionally generate and return a revised and/or encoded image of the exchanged electronic voucher ticket 527 to the smartphone 400. This step can be used to introduce additional security measures into the process and resulting exchanged electronic voucher ticket 527. Alternatively, the issuing casino voucher ticket database server 512 would cancel the originally issued issuing casino voucher ticket 514 and generate and return a newly issued voucher in a form of a exchanged electronic voucher ticket 527.

The user can request that the voucher ticket clearing house 540 can be exchanged from the issuing Casino or other gaming facility 510 to a different, desired exchanging Casino other gaming facility 520. When being exchanged, the server 512 associated with the issuing Casino or gaming facility 510 would be notified of the exchange. The server associated with the exchanging Casino or gaming facility 520 would also be notified of the exchange. The voucher ticket clearing house 540 would arrange a transfer of funds between the issuing casino voucher ticket database server 512 and the exchanging casino voucher ticket database server 522. The process can include a fee paid to the voucher ticket clearing house 540 for their services for completing the exchange.

Figure 19:
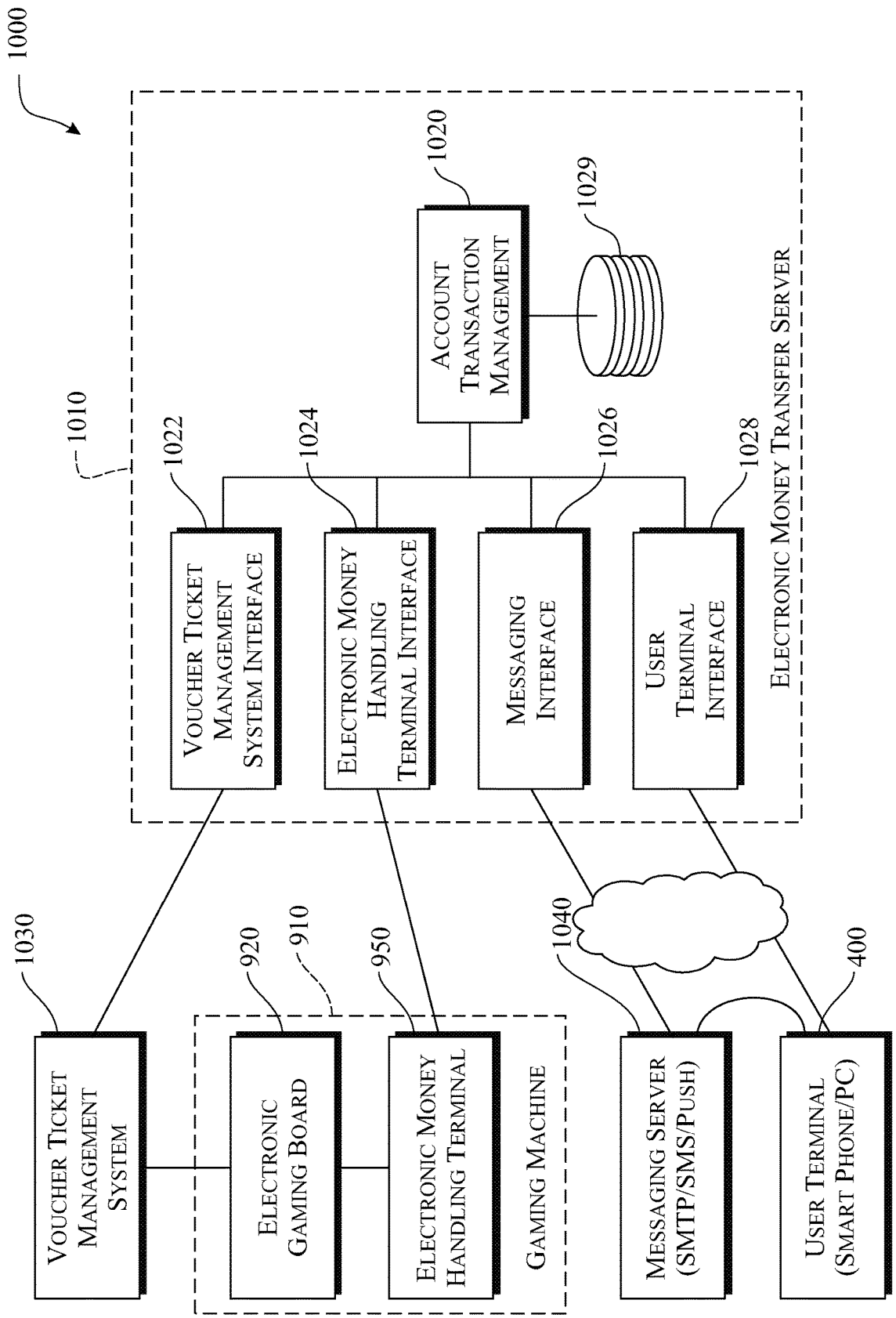
FIG. 19 presents a schematic diagram representative of components of an electronic money transaction system.

A schematic diagram detailing basic components of an electronic money transaction system 1000 is presented in FIG. 19. An electronic money transaction server 1010 comprises various elements to support the electronic money transaction system 1000. The electronic money transaction server 1010 includes an account transaction management system 1020, which is in digital data communication with an account transaction management database 1029. The account transaction management system 1020 and account transaction management database 1029 combination provide the financial transaction and data retention portion of the electronic money transaction server 1010. The electronic money transaction server 1010 further includes a series of subsystems arranged to interactively communicate with various external devices. A voucher ticket management system interface 1022 provides communication between the account transaction management segment 1020 and a voucher ticket management system 1030. An electronic money handling terminal interface 1024 provides communication between the account transaction management segment 1020 and a voucher ticket automated processing unit 910A messaging interface 1026 provides communication between the account transaction management segment 1020 and a messaging server 1040. A user terminal interface 1028 provides communication between the account transaction management segment 1020 and a user terminal, such as the Smartphone 400.

The voucher ticket management system 1030 provides a physical interface for the player to obtain voucher tickets 310, 410, exchange money for voucher tickets 310, 410, deposit funds into the player's digital account, and the like. The voucher ticket management system interface 1022 would be adapted to support a protocol for interfacing with the voucher ticket management system 1030. The voucher ticket management system interface 1022 would preferably be adapted to support a plurality of interfaces, broadening the adaptability of the voucher ticket management system interface 1022 to a variety of available management systems 1030. The voucher ticket management system 1030 is preferably as an automated machine, but could be provided at a cashier's station. In a configuration where the voucher ticket management system 1030 is through a cashier's station, the casher would interface with a terminal or other computing device configured to communicate with the voucher ticket management system interface 1022. The communication link between the voucher ticket management system interface 1022 and the voucher ticket management system 1030 can be wired, wireless, or both. It is understood that the voucher ticket management system interface 1022 and the voucher ticket management system 1030 can be integrated into a single unit/solution or separate as illustrated.

The electronic money handling terminal interface 1024 includes circuitry and associated instruction set (software) to provide an electronic money handling terminal interface. The process is directed towards an application for using voucher tickets 310, 410 for play on any voucher ticket automated processing unit 910. The voucher tickets 310, 410 can be sourced from the voucher ticket management system 1030 or through the bill validator and input slot 950 integrated into the voucher ticket automated processing unit 910. The bill validator and input slot 950 would be provided in digital data communication with the electronic money handling terminal interface 1024 or directly with the account transaction management segment 1020. The bill validator and input slot 950 would communicate the payment processing status to the processing circuit assembly 920, wherein the processing circuit assembly 920 would control operation of a gaming portion of the voucher ticket automated processing unit 910. Alternatively, payment for credits/play using the voucher ticket automated processing unit 910 can be provided through the voucher ticket management system 1030, wherein the voucher ticket management system 1030 would communicate directly with the processing circuit assembly 920. It is understood that these are only exemplary configurations and that the digital data communication between the voucher ticket automated processing unit 910 and the account transaction management segment 1020 can be provided in any suitable arrangement.

The messaging interface 1026 provides a messaging service to the account holder. The account transaction management segment 1020 would determine when appropriate messages should be conveyed to the account holder based upon any criteria. The criteria can be pre-established, updated, provided as an intermediary, or any other suitable trigger condition. The messaging interface 1026 forwards the appropriate message or messages to the messaging server 1040. The appropriate message or messages would include a target address. The messaging server 1040 utilizes the target address to direct the message to the account holder accordingly. The messaging server 1040 forwards the message to the target recipient in accordance with the format instructed by the messaging interface 1026. This can include simple mail transfer protocol (SMTP), commonly referred to as e-mail; short message service (SMS), commonly referred to as text messaging, push, or server push, which is a style of Internet-based communication where the request for a given transaction is initiated by the publisher or central server; and the like. The messaging service can be provided as a unidirectional configuration or a bi-directional configuration.

The user and electronic money transaction server 1010 can communicate with one another through a user terminal, represented by the Smartphone 400. The communication can be provided through a data system, such as the Internet; a wireless interface such as Bluetooth, Wi-Fi, Near Field Communications, and the like; infra-red, or any other communication link provided on a fixed or portable computing device. The communications can be unidirectional or a bi-directional, based upon the desired end result.

The cash-out process can be accomplished using any of a variety of processes, including issuing a paper voucher ticket 310, issuing an electronic voucher ticket 410, completing an electronic transfer of the financial value to the account transaction management segment 1020, and the like. The voucher ticket automated processing unit 910 can offer optional voucher ticket output configurations to the player. The voucher ticket automated processing unit 910 can be configured to offer issuance of either a paper voucher ticket 310 or an electronic voucher ticket 410. The output configuration can be established using any of a variety of inputs. A first exemplary basis to establish a cash-out mode would be from a selection made by the player or account owner. The player or account owner can select a desired output from either a paper voucher ticket mode or an electronic transfer mode. In a condition where the cash-out mode is established as the paper voucher ticket mode, the printer prints a paper voucher ticket 310. In a condition where the cash-out mode is established as the electronic transfer mode, the voucher ticket automated processing unit 910 transfers the associated balance to the account transaction management segment 1020.

The cash-out mode can be established based upon a current condition of the system. The system can optionally include a feature to convey the current cash-out mode to the player or user. This can include a visual indicator, such as a light, a colored light, a text message, a backlight stenciled message, and the like; an audible indicator, such as an audible output; a printed output, and the like. The system can include a feature enabling the player or user an ability to request to change the cash-out mode. One example of a selection feature could include at least one button, where the user would actuate the button accordingly. In a preferred variant, the system would include two buttons, wherein a first of the two buttons is associated with the paper voucher ticket mode and a second of the two buttons is associated with the electronic transfer mode. The player or user would select the button associated with the desired cash-out mode to establish or change the cash-out mode.

In one configuration, the system can default to cash-out mode to be the paper voucher ticket mode. This would be independent of the mode in which the funds are initially provided to the system. In one alternative configuration, the default mode can be established by the mode in which the funds are initially provided to the system. In a condition where the funds are initially provided using a paper voucher ticket 310, the default cash-out mode would be established as the paper voucher ticket mode. In a condition where the funds are initially provided using an electronic voucher ticket 410, the default cash-out mode would be established as the electronic transfer mode.

The configuration of the system can include trigger functions to direct a player or user to select the desired cash-out mode. For example, the system can direct the player or user to select the desired cash-out mode when the pending financial credit value is equal to zero. In another example, the system can direct the player or user to select the desired cash-out mode when the pending financial credit value is greater than zero.

In another configuration, the cash-out mode can default to a paper voucher ticket mode when the pending financial credit value equals zero. The cash-out mode can optionally be configured to return to the previously established cash-out mode upon replenishment of credits to the gaming machine 910.

In yet another configuration, the currently established cash-out mode can be converted to the paper voucher ticket mode when the gaming machine 910 receives submission of a financial transfer thereto to increase the available financial based credit, wherein the financial transfer originates from a source that differs from the electronic money account 1230, 1232, 1234, 1236, 1238, 1239 associated with the electronic ticket voucher 410.

In yet another configuration, the currently established cash-out mode can be converted to the paper voucher ticket mode from the electronic transfer mode when the gaming machine receives submission of a financial transfer thereto to increase the available financial based credit, wherein the financial transfer is accomplished using at least one of a paper bill and a paper voucher ticket.

In another configuration, the cash-out mode can default to a paper voucher ticket mode when the system encounters any of the following conditions:

(a) the mode is not in the electronic money management mode when the electronic money handling section receives the request to store the voucher ticket master ID to the electronic money management system, (b) the electronic money handling section does not have an effective and authenticated account associated with the electronic funds of the player, (c) the electronic money handling section fails in one of sending a request to store the voucher ticket master ID at the electronic money management system or receiving a result of the storing of the voucher ticket master ID from the electronic money management system, and (d) the electronic money handling section receives the result of the failure to store the voucher ticket master ID from the electronic money management system.

The system can include a feature enabling storage of the electronic voucher ticket information, particularly directed to a scenario where the gaming machine does not recognize the authenticated electronic money account. This can include an automated process when the gaming machine does not recognize the authenticated electronic money account, is unable to communicate with the account transaction management segment 1020, or any other scenario where the information may not be completely transferred between the gaming machine and the account transaction management segment 1020. This process can optionally employ a user interface input device, such as a button, enabling the user to request that the system store the electronic voucher ticket information.

The system can include a feature enabling printout of a receipt. The printed receipt can include at least one of: a cash-out amount, an initial credit submission, a partial transaction history, a complete transaction history, or any other information that would be appropriate. In one example, the printed receipt can include a complete history of at least one of the voucher ticket information and voucher ticket and electronic money account transactions.

The system can retain a history of statistical information associated with the processing of at least one of:
(a) paper bills,
(b) paper voucher tickets,
(c) electronic money, and
(d) electronic voucher tickets, The history of statistical information associated with the processing can be stored in any suitable digital memory format and associated digital memory device. In one example, the information can be stored in a removable memory module.

Figure 20:
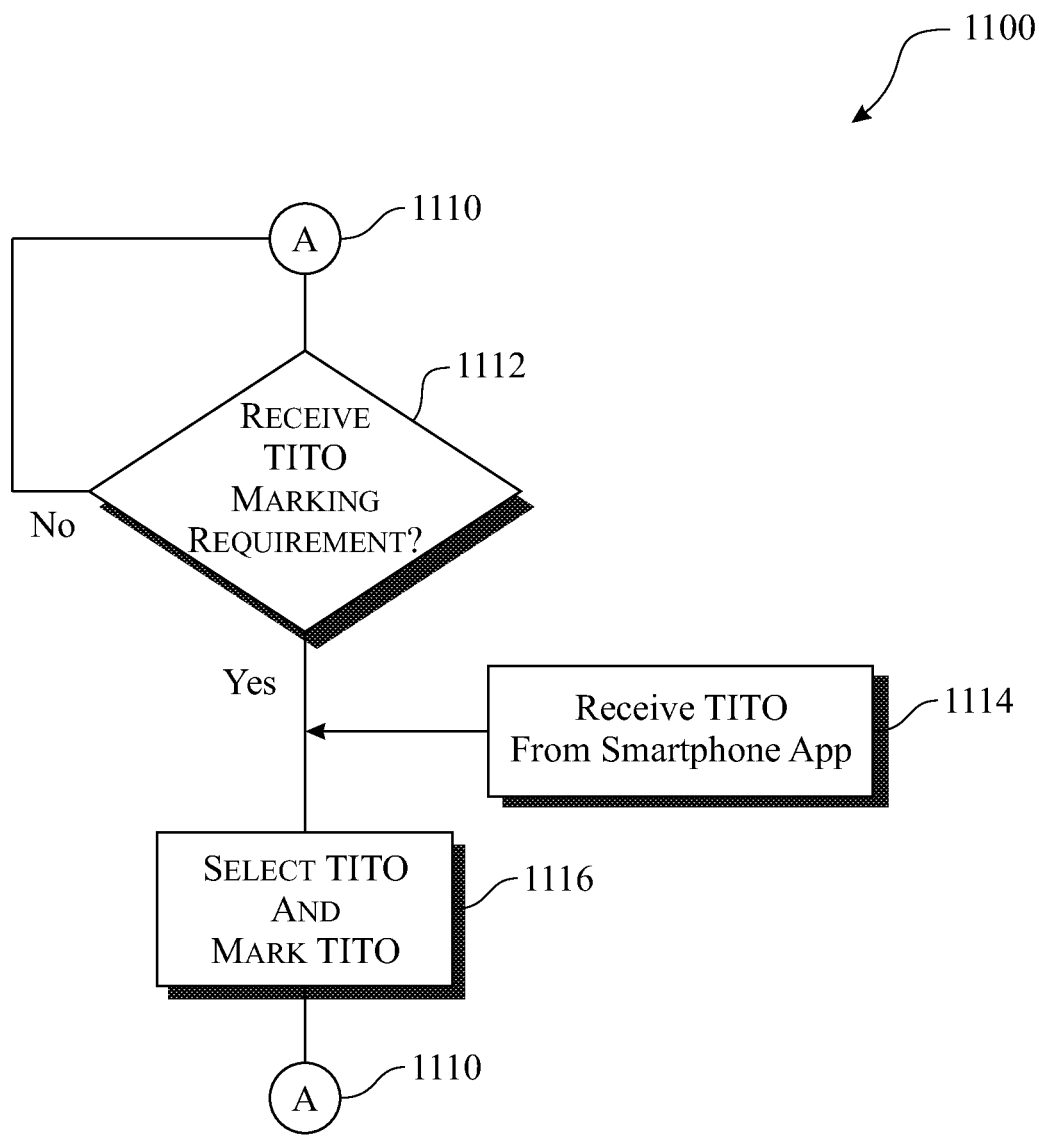
FIG. 20 presents an exemplary voucher ticket marking process flow diagram.

The process of employing voucher tickets 310, 410 requires a method to ensure the voucher tickets 310, 410 and associated financial system remain secure. One proposed method to ensure the authenticity of the voucher tickets 310, 410 would be to introduce an electronic marking system, as introduced in an exemplary voucher ticket marking process 1100 presented in FIG. 20. The voucher ticket marking process 1100 is representative of a subroutine that can be inserted into any voucher ticket processing instruction set. The process utilized information provided by the electronic money transaction server 1010. Communication with the electronic money transaction server 1010 is referenced by the network communication node 1110 illustrated at a start and an end of the voucher ticket marking process 1100. The device receives and validates receipt of the appropriate voucher ticket marking requirements from the electronic money transaction server 1010 (decision step 1112). In a condition where the received voucher ticket marking is considered acceptable, the process continues. In a condition where the received voucher ticket marking is not received or considered unacceptable, the process submits a subsequent request for the appropriate voucher ticket marking requirements. The user forwards the electronic voucher ticket 410 to the receiving device (step 1114). Upon receipt of the electronic voucher ticket 410 from the electronic voucher ticket submitter, the specific voucher ticket 410 is selected and subsequently marked in accordance with the appropriate voucher ticket marking requirements (step 1116).

The electronic voucher tickets 410 are managed through the account transaction management segment 1020 and stored in any suitable information storage configuration, such as one or more tables provided in one or more databases. A voucher ticket (TITO) account table 1200 utilizes a voucher ticket (TITO) account number listing 1210 to retain a series of player's accounts, as presented in FIG. 21. Each account is identified by an account number 1230, 1232, 1234, 1236, 1238, 1239. The account number 1230, 1232, 1234, 1236, 1238, 1239 provides a continuity link identifying other associated elements. One exemplary data element is an electronic account (e-money) financial balance, as represented by a list of voucher ticket (TITO) account financial balances 1212. A second exemplary data element is a message destination table segment 1220. The message destination table segment 1220 can include a number of different protocols for communicating with the account owner. The exemplary voucher ticket (TITO) account table 1200 presents three exemplary listings, including an email address listing 1222, a short message service (SMS) number listing 1224, and any other notification listing 1226. The email address listing 1222 would include one or more email addresses for each account number. The short message service (SMS) number listing 1224 would include one or more short message services (SMS) (text message) addresses for each account number. The other notification listing 1226 can list any other suitable address for contacting the account owner. This can include mailing addresses, landline voice telephone numbers, or any other suitable manner to contact the account owner. The other notification listing 1226 is representative of a catch all option. It is understood that other dedicated listings can be added to accommodate any other suitable address for contacting the account owner.

A stored voucher ticket (TITO) status table 1250 utilizes the voucher ticket (TITO) account number listing 1210 to associate and manage one or more voucher tickets 310, 410 of a series of player's accounts, as presented in FIG. 22. The stored voucher ticket (TITO) status table 1250 manages and retains information associated with each voucher ticket. Each voucher ticket 410 includes a local identifier, as listed in a voucher ticket (TITO) local identification reference 1260 and a master identifier as listed in a voucher ticket (TITO) master identification reference 1262. The local identifier is used for identification of the voucher ticket 410. The master identifier is used for identification of the voucher ticket 410. The stored voucher ticket (TITO) status table 1250 retains a financial value associated with each voucher ticket, as listed in a voucher ticket (TITO) financial value 1264. The stored voucher ticket (TITO) status table 1250 can include a voucher ticket (TITO) status 1266, which identifies the current status of each of the listed voucher tickets 410. Examples of current status of the voucher tickets 410 include currently valid, considered invalid, considered expired, and currently pending. The stored voucher ticket (TITO) status table 1250 can include a voucher ticket (TITO) expiration 1268, which identifies the established expiration date and time of each of the listed voucher tickets 310, 410. The voucher ticket (TITO) expiration 1268 can include other references, such as "unknown" in a condition where there is an issue with the expiration date and pending in a condition where the voucher ticket 410 is currently in a pending state and the expiration has not yet been established.

An additional feature associated with each voucher ticket 410 is an electronic marker. The electronic markers can be stored on a voucher ticket (TITO) marking table 1270, as shown in the exemplary table presented in FIG. 23. Each voucher ticket 410 would be associated with a player's account 1230, 1232, 1234, 1239. It is noted that each player's account can be associated with one or more voucher tickets 310, 410. For example, the first account listing 1230 is associated with three different voucher tickets 310, 410 (1010057Z, 0000036X, 3175041A), as shown in a column identifying the voucher ticket (TITO) master identification references 1280. The electronic marking can be a timestamp when the voucher ticket 410 is issued out, returned into the account, or any other time associated with an activity of the voucher ticket, as shown in a column identifying a voucher ticket (TITO) marked date 1282 and a paired column identifying a voucher ticket (TITO) marked timestamp 1284. The 3510547S exemplifies a condition where a marking for the voucher ticket 410 is currently pending.

Figure 24:
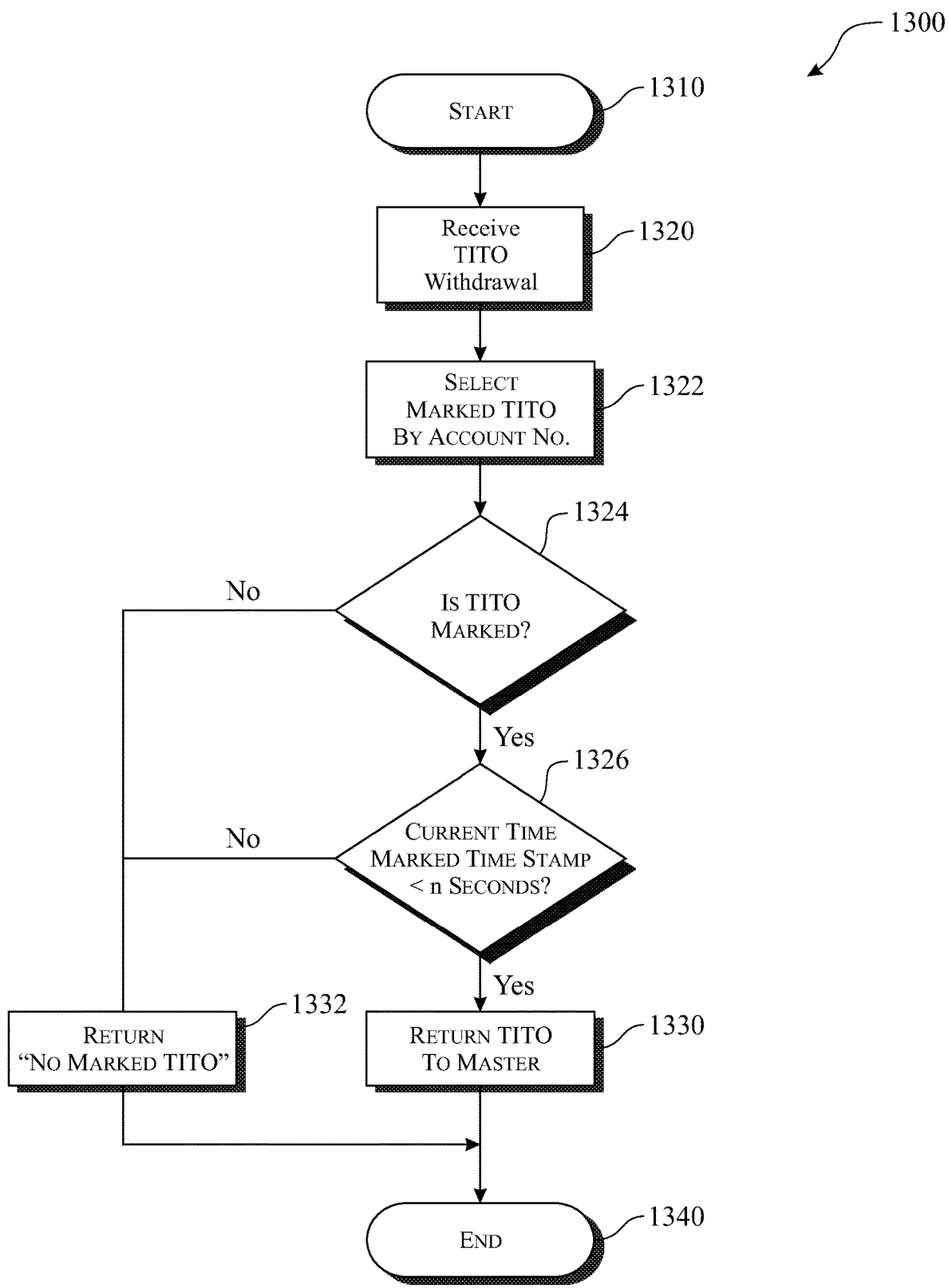
FIG. 24 presents an exemplary voucher ticket issuance flow diagram.

An exemplary voucher ticket (TITO) voucher ticket withdrawal process 1300 is presented in FIG. 24. The process initiates (step 1310) with a request to withdraw a voucher ticket 410 (step 1320) from a voucher ticket automated processing unit 910 of a kiosk or a gaming machine. The request can be submitted through the voucher ticket management system 1030, the user terminal (such as the Smartphone 400), a cashier, or any other process adapted to submit the request. The account transaction management segment 1020 returns a list of voucher tickets 410 associated with the player's account 1230, 112, 1234, 1239 as shown in FIG. 22. The user selects a voucher ticket 410 from the list of voucher tickets 410 associated with the player's account 1230, 112, 1234, 1239 (step 1322). The process continues by determining if the voucher ticket 410 is marked (step 1324) as shown in FIG. 23. The process reviews the list of voucher tickets 410 to determine if the voucher ticket 410 is marked (decision step 1324). In a condition where the process determines that the voucher ticket 410 is not marked, the process returns a "no marked voucher ticket" message to the user (step 112) and terminates the process (step 1340). In a condition where the process determines that the voucher ticket 410 is marked, the process verifies that the marking is within a valid time frame (decision step 1326). In a condition where the process determines that the voucher ticket 410 is marked and that the voucher ticket 410 is not within the valid time frame, the process returns a "no marked voucher ticket" message to the user (step 112) and terminates the process (step 1340). In a condition where the process determines that the voucher ticket 410 is marked and that the voucher ticket 410 is within the valid time frame, the process issues the voucher ticket (master ID) to the user (step 110) and terminates the process (step 1340).

It is understood that the system and associated processes disclosed for use with a voucher ticket automated processing unit 910 can be adapted to an Automated Teller Machine (ATM) or any other automated financial transacting machine. For example, the Automated Teller Machine (ATM) would include a bill validator that is adapted to validate both paper bills and a paper voucher ticket. The Automated Teller Machine (ATM) would include a communication link to the voucher ticket management system interface 1022, which is in communication with the account transaction management segment 1020. The voucher ticket automated processing unit 910 and/or the Automated Teller Machine (ATM) would include an input device for receiving electronic money from an external media, wherein the input device would be at least one of: a magnetic strip card reader, an integrated smart card reader, a barcode scanner, a Quick Read (QR) code scanner, a near field communication (NFC) signal reader, a short range RF signal reader, a radio frequency identification (RFID) signal reader, and the like.

It is understood that the above presented exemplary exchange embodiments can be tailored by mixing the processes. For example, the player can insert a paper voucher ticket 310 into the voucher ticket automated processing unit 910 and request an electronic voucher ticket 410 as an exchanged output.

INDUSTRIAL APPLICABILITY

The present invention is applicable to electronic payment systems for automated machines such as gaming machines, automated teller machines, vending machines, money exchangers or other money-operated equipment or apparatus.

| Ref. No's | Description |
|---|---|
| 99 | electronic payment system |
| 100 | automated machine |
| 110 | gaming hardware |
| 120 | drive device |
| 130 | bill acceptor |
| 132 | passageway |
| 134 | inlet sensor |
| 135 | bill sensor |
| 136 | control device |
| 138 | memory device |
| 139 | stacker |
| 140 | automatic payment device |
| 142 | financial database |
| 144 | ticket voucher database |
| 146 | gaming facility host server |
| 150 | communications device |
| 152 | communications interface |
| 154 | signal processor |
| 156 | converter |
| 158 | leap forward gaming |
| 160 | printer |
| 170 | readout device |
| 172 | mobile digital storage device |
| 180 | visual and/or acoustic display device |
| 182 | entry device |
| 184 | force-quit button |
| 190 | mobile terminal |
| 192 | CPU |
| 193 | digital storage device |
| 194 | user entry device |
| 196 | wireless communication system |
| 198 | wireless signal receiving system |
| 199 | user |
| 200 | first financial process flow diagram |
| 201 | entry and transfer of a financial value and authorization information step |
| 202 | forwarding of received financial value and authorization information step |
| 203 | credit check or any other associated transaction validation process completed by bill validator step |
| 204 | authorization approval and balance check for available funds in account step |
| 205 | feedback of balance check and authorization to the bill validator step |

-continued

| Ref. No's | Description |
|---|---|
| 206 | bill validator communicates the outcome of the request (accepted or denied) to the user step |
| 207 | user enters the electronic voucher ticket into the bill validator associated with the automated machine step |
| 208 | automated machine digitally conveys the transaction to the gaming facility host server step |
| 209 | gaming facility host server provides feedback to the automated machine on whether the electronic voucher ticket is accepted or rejected step |
| 210 | user begins play on the gaming machine step |
| 220 | financial process flow diagram |
| 221 | user submitting a request for tendering payment for issuance of credits onto the electronic voucher ticket step |
| 222 | mobile wallet server issues and forwards the electronic voucher ticket to the Smartphone step |
| 223 | Smartphone communicates information associated with the electronic voucher ticket to the bill validator via the near field communications device step |
| 224 | bill validator can optionally transfer a request to print a paper voucher ticket to the printer step |
| 225 | paper voucher ticket is dispensed and provided to the user step |
| 226 | user enters either the paper voucher ticket or the electronic voucher ticket into the bill validator for use with an associated automated machine step |
| 227 | bill validator forwards information directly or indirectly to the gaming facility host server step |
| 228 | bill validator forwards information directly or indirectly to the gaming facility host server step |
| 229 | gaming facility host server provides feedback to the automated machine on whether the electronic voucher ticket is accepted or rejected step |
| 230 | user begins play on the gaming machine step |
| 240 | financial process flow diagram |
| 241 | user submitting a request for issuance of credits onto the electronic voucher ticket step |
| 242 | request is entered using an application on the Smartphone via a communication with the near field communications device step |
| 243 | near field communications device forwards the information via a digital communication link with the bill validator step |
| 244 | bill validator forwards the information directly or indirectly to the gaming facility host server |
| 245 | bill validator forwards the information directly or indirectly to the gaming facility host server |
| 246 | "gaming facility host server, in conjunction with the automated machine, tallies any tendered balance, concludes play of the game, and issues a digital electronic voucher ticket step" |
| 247 | new electronic voucher ticket is forwarded to the near field communications device step |
| 248 | new electronic voucher ticket is transferred to the Smartphone using near field communication protocol step |
| 310 | paper voucher ticket |
| 312 | paper voucher ticket substrate |
| 320 | casino identifier |
| 322 | master ticket identifier |
| 324 | local ticket identifier |
| 326 | voucher ticket issue date |
| 328 | voucher ticket expiration date |
| 10 | human readable value reference |
| 12 | computer readable value reference |
| 400 | Smartphone |
| 402 | Smartphone housing |
| 404 | Smartphone display |
| 405 | Smartphone mechanical user control interface |
| 406 | microphone |
| 408 | speaker |
| 409 | camera |
| 410 | electronic voucher ticket |
| 412 | digitizing image |
| 420 | casino identifier |
| 422 | master ticket identifier |
| 424 | local ticket identifier |
| 426 | voucher ticket issue date |
| 428 | voucher ticket expiration date |
| 430 | human legible value reference |
| 432 | computer legible value reference |
| 510 | casino A |
| 512 | casino A voucher ticket database server |
| 514 | casino A voucher ticket |
| 515 | casino A electronic voucher ticket |
| 516 | casino A exchanged voucher ticket |

-continued

| Ref. No's | Description |
| --- | --- |
| 520 | casino B |
| 522 | casino B voucher ticket database server |
| 524 | casino B voucher ticket |
| 526 | casino B exchanged voucher ticket |
| 527 | casino B exchanged electronic voucher ticket |
| 528 | casino B exchanged electronic voucher ticket issue date |
| 529 | casino B exchanged electronic voucher ticket expiration date |
| 530 | casino C |
| 532 | casino C voucher ticket database server |
| 534 | casino C voucher ticket |
| 536 | casino C exchanged voucher ticket |
| 540 | voucher ticket clearing house |
| 542 | ticket exchange process |
| 544 | voucher ticket exchange commission fee |
| 560 | currency |
| 562 | coins |
| 580 | e-money or ticket voucher management system |
| 582 | player's e-money account |
| 590 | player's cards |
| 592 | player's cards |
| 594 | player's cards |
| 596 | player's cards |
| 600 | electronic financial process flow |
| 610 | voucher ticket print-out mode (idle) step |
| 612 | insert magnetic strip carrying card step |
| 614 | insert ticket voucher step |
| 620 | enter e-account information step |
| 622 | determining if the entered e-account information is consistent with the information stored on the casino voucher ticket database server decision step |
| 624 | transferring a new electronic voucher ticket to the Smartphone step |
| 626 | print and dispense a new paper voucher ticket step |
| 628 | idle step |
| 630 | entering the e-account information into the gaming machine step |
| 632 | determine if the entered information is consistent with the information stored on the casino voucher ticket database server decision step |
| 636 | rejection of the request for entry of a financial value step |
| 638 | process termination/idle step |
| 640 | toggling into an electronic money management mode step |
| 642 | request to cash out step |
| 644 | player can continue playing (i.e. player maintains a positive credit) step |
| 646 | insert a magnetic card into the game machine to identify the player step |
| 648 | "insert a bill, a paper voucher ticket, or the like into the game machine step" |
| 649 | would enter the e-account information step |
| 650 | clear the account step |
| 652 | idle stage step |
| 660 | clear the pending account step |
| 670 | determine if the entered e-account information is the same as the e-account currently pending in the game machine decision step |
| 672 | player decision to increase the pending credit value decision step |
| 674 | "player elects to continue playing with the pending credit, the system continues play using e-money step" |
| 676 | player enters the associated e-account and authorization information step |
| 678 | system determines an inconsistency between entered information account information and notifies the player of the inconsistency and rejects a request for an e-account transfer step |
| 679 | upload and apply the financial value to the pending credits step |
| 680 | player enter authorization and a financial transaction to apply credits step |
| 682 | request presented to player to enter the associated e-account and authorization information step |
| 686 | player rejects a request to upload additional credits step |
| 688 | gaming machine returns to an idle condition step |
| 700 | bill validator system |
| 710 | e-money integrated bill validator structure |
| 720 | upper communication control |
| 730 | gaming status watching |
| 732 | image processing and paper processing |
| 734 | mode selector |
| 736 | printing process control |
| 740 | electronic money handling |
| 742 | input control device |
| 744 | device dependent drivers |
| 750 | network communications |
| 760 | electronic money management system |
| 770 | gaming machine operational system |
| 800 | gaming machine network |
| 801 | modified gaming machine network |
| 810 | gaming machine configuration |

-continued

| Ref. No's | Description |
| --- | --- |
| 811 | modified gaming machine configuration |
| 812 | gaming machine main controller |
| 814 | host communication controller |
| 820 | user interface management |
| 822 | monitor controller |
| 824 | audio controller |
| 826 | input management |
| 830 | wager gaming processor |
| 840 | peripheral controller |
| 842 | printer |
| 844 | bill validator |
| 850 | player card account management |
| 852 | magnetic card reader |
| 860 | network communications |
| 870 | electronic money management system |
| 880 | casino hosts |
| 890 | mode selector |
| 892 | electronic money handling system |
| 910 | voucher ticket automated processing unit |
| 920 | processing circuit assembly |
| 922 | central processing unit |
| 924 | digital memory device |
| 930 | general memory storage device |
| 932 | encoding protocol |
| 934 | second encoding protocol |
| 940 | display monitor |
| 942 | user input device |
| 950 | bill validator and input slot |
| 952 | printed and discharge slot |
| 1000 | electronic money transaction system |
| 1010 | electronic money transaction server |
| 1020 | account transaction management segment |
| 1022 | voucher ticket management system interface |
| 1024 | electronic money handling terminal interface |
| 1026 | messaging interface |
| 1028 | user terminal interface |
| 1029 | account transaction management database |
| 1030 | voucher ticket management system |
| 1040 | messaging server |
| 1100 | voucher ticket marking process |
| 1110 | network communication node |
| 1112 | received voucher ticket (TITO) marking requirement decision step |
| 1114 | receive voucher ticket (TITO) from user terminal step |
| 1116 | select voucher ticket (TITO) and mark voucher ticket according to marking requirement step |
| 1200 | voucher ticket (TITO) account table |
| 1210 | voucher ticket (TITO) account number listing |
| 1212 | voucher ticket (TITO) account financial balance |
| 1220 | message destination table segment |
| 1222 | email address listing |
| 1224 | short message service (SMS) number listing |
| 1226 | other notification listing |
| 1230 | first account listings |
| 1232 | second account listing |
| 1234 | third account listing |
| 1236 | fourth account listing |
| 1238 | fifth account listing |
| 1239 | nth account listing |
| 1250 | stored voucher ticket (TITO) status table |
| 1260 | voucher ticket (TITO) local identification reference |
| 1262 | voucher ticket (TITO) master identification reference |
| 1264 | voucher ticket (TITO) financial value |
| 1266 | voucher ticket (TITO) status |
| 1268 | voucher ticket (TITO) expiration |
| 1270 | voucher ticket (TITO) marking table |
| 1280 | voucher ticket (TITO) master identification reference |
| 1282 | voucher ticket (TITO) marked date |
| 1284 | voucher ticket (TITO) marked timestamp |
| 1300 | voucher ticket (TITO) voucher ticket withdrawal process |
| 1310 | voucher ticket withdrawal process initialization step |
| 1320 | receive voucher ticket (TITO) withdrawal request from user terminal step |
| 1322 | select marked voucher ticket (TITO) by account number step |

| Ref. No's | Description |
| --- | --- |
| 1324 | validate voucher ticket (TITO) is marked decision step |
| 1326 | is the validate voucher ticket (TITO) marking current decision step |
| 110 | return voucher ticket (TITO) to master index step |
| 112 | return no marked voucher ticket (TITO) is available step |
| 1340 | voucher ticket marking process termination step |

What is claimed are:

1. A voucher ticket system, comprising:
a value input device communicably coupled to an electronic gaming machine; and
at least one server that:
obtains information about a print voucher ticket received by the value input device, the print voucher ticket associated with a first value;
receives data from the value input device that is based on a communication between the value input device and a mobile device;
determines an association between the information about the print voucher ticket received by the value input device and a mobile wallet account or a voucher ticket account using the data received from the value input device; and
based on the association, at least one of:
increments the mobile wallet account by a second value; or
records at least a portion of the information to the voucher ticket account.

2. The voucher ticket system of claim 1, wherein the value input device comprises a bill validator.

3. The voucher ticket system of claim 1, wherein the value input device comprises a bill validator coupled to the electronic gaming machine.

4. The voucher ticket system of claim 1, wherein the at least one server communicates with a ticketing server to validate the print voucher ticket.

5. The voucher ticket system of claim 1, wherein the at least one server communicates with a ticketing server to redeem the print voucher ticket.

6. The voucher ticket system of claim 1, wherein the first value and the second value are different amounts of currency.

7. The voucher ticket system of claim 1, wherein the first value is different from the second value.

8. A voucher ticket system server, comprising:
at least one communication interface configured to communicate with an electronic gaming machine, a value input device that is communicably coupled to the electronic gaming machine, and a ticketing server; and
at least one processing unit configured to:
obtain information about a print voucher ticket received by the value input device, the print voucher ticket associated with a first value;
receive data from the electronic gaming machine that is based on a communication between the value input device and a mobile device;
determine an association between the information about the print voucher ticket received by the value input device and a mobile wallet account using the data received from the electronic gaming machine;
communicate with the ticketing server to redeem the print voucher ticket; and
based on the association, increment the mobile wallet account by a second value.

9. The voucher ticket system server of claim 8, wherein the second value is derived from the first value.

10. The voucher ticket system server of claim 8, wherein the first value is equal to the second value.

11. The voucher ticket system server of claim 8, wherein the first value and the second value are different amounts of currency.

12. The voucher ticket system server of claim 8, wherein the at least one processing unit instructs the value input device to omit providing a credit to the electronic gaming machine related to receipt of the print voucher ticket.

13. The voucher ticket system server of claim 8, wherein the at least one processing unit is further configured to:
receive a request to tender a payment from the mobile wallet account for a credit on the electronic gaming machine; and
instruct application of the credit on the electronic gaming machine.

14. The voucher ticket system server of claim 8, wherein the at least one processing unit verifies whether the print voucher ticket is valid as part of communicating with the ticketing server to redeem the print voucher ticket.

15. A voucher ticket system server, comprising:
at least one communication interface configured to communicate with an electronic gaming machine, a value input device that is communicably coupled to the electronic gaming machine, and a ticketing server; and
at least one processing unit configured to:
obtain information about a print voucher ticket received by the value input device, the print voucher ticket associated with a value;
receive data from a mobile device that is based on a communication between the mobile device and the value input device or the electronic claming machine;
determine an association between the information about the print voucher ticket received by the value input device and a voucher ticket account using the data received from the mobile device;
communicate with the ticketing server to validate the print voucher ticket; and
based on the association, record at least a portion of the information to the voucher ticket account.

16. The voucher ticket system server of claim 15, wherein the information includes a ticket identifier and an indicator of the value.

17. The voucher ticket system server of claim 16, wherein the ticketing server stores the ticket identifier and the indicator of the value in association with the voucher ticket account.

18. The voucher ticket system server of claim 15, wherein the at least one processing unit instructs the value input device to omit providing a credit to the electronic gaming machine related to receipt of the print voucher ticket.

19. The voucher ticket system server of claim 15, wherein the at least one processing unit is further configured to:

receive a request to redeem an electronic voucher ticket associated with the voucher ticket account; and communicate with the ticketing server to redeem the electronic voucher ticket.

20. The voucher ticket system server of claim 19, wherein:

the value is a first value; and upon redeeming the electronic voucher ticket, the at least one processing unit is further configured to perform at least one of:

incrementing a mobile wallet account a second value, the mobile wallet account determined using additional data associated with the request; or applying a credit of the second value to the electronic gaming machine.

* * * * *